US012272863B2

(12) United States Patent
An et al.

(10) Patent No.: US 12,272,863 B2
(45) Date of Patent: Apr. 8, 2025

(54) ELECTRONIC DEVICE INCLUDING ANTENNA SUPPORTING STRUCTURE

(71) Applicant: SAMSUNG ELECTRONICS CO., LTD., Suwon-si (KR)

(72) Inventors: Yonghee An, Suwon-si (KR); Pilwon Seo, Suwon-si (KR); Bitna Kim, Suwon-si (KR); Haewon Sung, Suwon-si (KR); Yongwon Cho, Suwon-si (KR); Junhee Han, Suwon-si (KR); Jeongseob Kim, Suwon-si (KR); Hyunsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 166 days.

(21) Appl. No.: 18/109,006

(22) Filed: Feb. 13, 2023

(65) Prior Publication Data
US 2023/0253698 A1    Aug. 10, 2023

Related U.S. Application Data

(63) Continuation of application No. PCT/KR2023/000566, filed on Jan. 12, 2023.

(30) Foreign Application Priority Data

Feb. 8, 2022    (KR) .................. 10-2022-0016479

(51) Int. Cl.
*H01Q 1/24*    (2006.01)
*H01Q 5/307*    (2015.01)
*H01Q 9/04*    (2006.01)

(52) U.S. Cl.
CPC .............. *H01Q 1/24* (2013.01); *H01Q 5/307* (2015.01); *H01Q 9/0407* (2013.01)

(58) Field of Classification Search
CPC ........ H01Q 1/24; H01Q 5/307; H01Q 9/0407; H01Q 1/1207; H01Q 1/22; H01Q 1/38;
(Continued)

(56) References Cited

U.S. PATENT DOCUMENTS 10,141,625 B1    11/2018  Ryu et al.
2007/0231962 A1    10/2007  Fujii
(Continued)

FOREIGN PATENT DOCUMENTS

JP    2007-266443 A    10/2007
KR    100880542 B1    2/2009
(Continued)

OTHER PUBLICATIONS

International Search Report (PCT/ISA/210) issued by the International Searching Authority on Apr. 14, 2023 in International Patent Application No. PCT/KR2023/000566.
(Continued)

*Primary Examiner* — Dimary S Lopez Cruz
*Assistant Examiner* — Michael M Bouizza
(74) *Attorney, Agent, or Firm* — Sughrue Mion, PLLC

(57) ABSTRACT

An electronic device includes a housing, an antenna structure disposed in an inner space of the housing, a wireless communication circuit disposed in the inner space, and a first bracket. The antenna structure includes a substrate having a first substrate surface facing in a first direction and a second substrate surface facing in a second direction opposite to the first substrate surface, and a plurality of chip antennas sequentially arranged on the first substrate surface in a third direction perpendicular to the first direction. Each of the plurality of chip antennas includes an antenna element and is separated in the third direction from remaining chip antennas by separation spaces. The first bracket includes first and second protrusions that protrude in the second direction
(Continued)

to correspond to the first substrate surface of the substrate. The protrusions are aligned, in the third direction, with the separation spaces.

20 Claims, 13 Drawing Sheets

(58) Field of Classification Search
CPC ........ H01Q 1/48; H01Q 1/2283; H01Q 1/243; H01Q 1/521; H04M 1/02; H04M 1/026
See application file for complete search history.

(56) References Cited

U.S. PATENT DOCUMENTS

| | | | |
|---|---|---|---|
| 2013/0063236 | A1 | 3/2013 | Shin et al. |
| 2016/0134008 | A1 | 5/2016 | Kim et al. |
| 2020/0110155 | A1 | 4/2020 | Cho et al. |
| 2020/0168977 | A1 | 5/2020 | Son et al. |
| 2020/0194879 | A1 | 6/2020 | Lim et al. |
| 2020/0212584 | A1 | 7/2020 | Park et al. |
| 2020/0266522 | A1* | 8/2020 | Moon .................... H01Q 1/243 |
| 2020/0287268 | A1 | 9/2020 | Moon et al. |
| 2020/0411978 | A1 | 12/2020 | Jeon et al. |
| 2021/0091450 | A1 | 3/2021 | Park et al. |
| 2021/0126347 | A1 | 4/2021 | Kim et al. |
| 2021/0218128 | A1 | 7/2021 | Lee et al. |
| 2021/0313706 | A1 | 10/2021 | Hiramatsu et al. |
| 2021/0376453 | A1 | 12/2021 | Han et al. |
| 2021/0377372 | A1 | 12/2021 | Jung et al. |
| 2022/0216594 | A1* | 7/2022 | Song .................... H01Q 15/24 |
| 2022/0216613 | A1 | 7/2022 | Jeon |
| 2023/0055640 | A1* | 2/2023 | Choi ........................ H01Q 3/36 |
| 2023/0170604 | A1* | 6/2023 | Jo ........................... H01Q 1/243 343/702 |
| 2023/0411869 | A1* | 12/2023 | Jang ....................... H01Q 1/243 |

FOREIGN PATENT DOCUMENTS

| | | |
|---|---|---|
| KR | 101113346 B1 | 2/2012 |
| KR | 10-2013-0028571 A | 3/2013 |
| KR | 101403394 B1 | 6/2014 |
| KR | 101588253 B1 | 1/2016 |
| KR | 10-2016-0054848 A | 5/2016 |
| KR | 10-2019-0008067 A | 1/2019 |
| KR | 10-2020-0040148 A | 4/2020 |
| KR | 10-2020-0046399 A | 5/2020 |
| KR | 1020200081760 A | 7/2020 |
| KR | 10-2021-0015559 A | 2/2021 |
| KR | 10-2021-0033796 A | 3/2021 |
| KR | 10-2021-0043321 A | 4/2021 |
| KR | 10-2021-0050267 A1 | 5/2021 |
| KR | 10-2021-0147712 A | 12/2021 |
| WO | 2020/040259 A1 | 2/2020 |
| WO | 2020/040499 A1 | 2/2020 |

OTHER PUBLICATIONS

Written Opinion (PCT/ISA/237) issued by the International Searching Authority on Apr. 14, 2023 in International Patent Application No. PCT/KR2023/000566.
European Extended Search Report issued Feb. 14, 2025 by the European Patent Office for EP Patent Application No. 23753006.8.

* cited by examiner

ELECTRONIC DEVICE INCLUDING ANTENNA SUPPORTING STRUCTURE

CROSS-REFERENCE TO RELATED APPLICATIONS

This application is a continuation application of International Application No. PCT/KR2023/000566, filed on Jan. 12, 2023, which claims priority to Korean Patent Application 10-2022-0016479, filed on Feb. 8, 2022, in the Korean Intellectual Property Office, the disclosures of which are incorporated by reference herein in their entireties.

BACKGROUND

1. Field

The disclosure relates generally to electronic devices, and more particularly, to an electronic device including an antenna support structure.

2. Description of Related Art

With the growth of wireless communication technology, electronic devices (e.g., electronic devices for communication) are widely used in daily life, and thus the use of content may increase substantially (e.g., exponentially). Due to the rapid increase in the use of content, the capacity of the wireless communication networks may gradually reach their respective limits. In order to meet the increasing demand for radio data traffic after the commercialization of the 4th-generation (4G) communication systems, a communication system (e.g., 5G, pre-5G, or new radio (NR) communication system) that transmits and/or receives a signal using a frequency of a super-high frequency (e.g., mmWave) band (e.g., 3 GHz to 300 GHz band) is being researched. For example, an electronic device may require an efficient support structure for an antenna structure operating in such a high frequency band.

There exists a need for further improvements in wireless communication technology. These improvements may also be applicable to other multi-access technologies and the telecommunication standards that employ these technologies.

Next-generation wireless communication technology is capable of transmitting and receiving radio signals using frequencies substantially in the range of 3 GHz to 300 GHz. Therefore, an efficient mounting structure for overcoming high free space loss due to frequency features and increasing antenna gain, and a corresponding new antenna structure (e.g., antenna module) are being developed. The antenna structure may include a plurality of antenna elements (e.g., conductive patches or conductive patterns) disposed in an array form at designated intervals. These antenna elements may be arranged so that a beam pattern is formed in one direction inside the electronic device. For example, the antenna structure may be disposed such that a beam pattern is formed toward at least a portion of the front surface, the rear surface, and/or the side surface of the electronic device.

The antenna structure may include a substrate and antennas (e.g., chip antennas) disposed at designated intervals on the substrate. The antenna structure may be supported at least in part through at least one bracket disposed in an inner space of the electronic device.

However, the at least one bracket has only a support structure for supporting the antenna structure and may not have a design structure optimized for reducing deterioration of heat dissipation and/or radiation performance for the antenna structure.

SUMMARY

Various embodiments of the disclosure may provide an electronic device including an antenna support structure considering heat dissipation.

Various embodiments of the disclosure may provide an electronic device including an antenna support structure configured to reduce radiation performance degradation.

The technical problems to be solved in the disclosure are not limited to the above-mentioned technical problems, and those of ordinary skill in the art to which the disclosure pertains will clearly understand, from the following description, other technical problems not mentioned herein.

According to an aspect of an example embodiment, an electronic device includes: a housing; an antenna structure disposed in an inner space of the housing, the antenna structure including: a substrate having a first substrate surface facing in a first direction and a second substrate surface facing in a second direction opposite to the first substrate surface, and a plurality of chip antennas sequentially arranged on the first substrate surface in a third direction perpendicular to the first direction, the plurality of chip antennas including a first chip antenna, a second chip antenna, and a third chip antenna sequentially arranged on the first substrate surface, each of the first chip antenna, the second chip antenna, and the third chip antenna including an antenna element, wherein the first chip antenna and the second chip antenna are separated in the third direction by a first separation space, the second chip antenna and the third chip antenna are separated in the third direction by a second separation space, and at least one of the first separation space and the second separation space has a first width in the third direction; a wireless communication circuit disposed in the inner space and configured to transmit or receive a radio signal in a designated frequency band through the antenna structure; and a first bracket including a first protrusion and a second protrusion that protrude in the second direction to correspond to the first substrate surface of the substrate and are spaced apart from each other, wherein at least one of the first protrusion and the second protrusion has a second width that is greater than the first width in the third direction, wherein the first protrusion is aligned, in the third direction, with the first separation space and overlaps with at least a portion of the first chip antenna and at least a portion of the second chip antenna, and wherein the second protrusion is aligned, in the third direction, with the second separation space and overlaps with at least another portion of the second chip antenna and at least a portion of the third chip antenna.

The first protrusion overlaps, in the third direction, with the first chip antenna by a first amount, and the first protrusion overlaps, in the third direction, with the second chip antenna by a second amount that is substantially equal to the first amount, and the second protrusion with overlaps, in the third direction, the second chip antenna by a third amount, and the second protrusion overlaps, in the third direction, with the third chip antenna by fourth amount that is substantially equal to the third amount.

The first bracket may further include a third protrusion and a fourth protrusion that protrude in the second direction to correspond to the first substrate surface, the first protrusion may be positioned between the third protrusion and the second protrusion, and the second protrusion may be positioned between the first protrusion and the fourth protrusion, the antenna element of the first chip antenna overlaps, in the third direction, with a first recess of the first bracket between the first protrusion and the third protrusion, the antenna element of the second chip antenna overlaps, in the third direction, with a second recess of the first bracket between the first protrusion and the second protrusion, and the antenna element of the third chip antenna overlaps, in the third direction, with a third recess of the first bracket between the second protrusion and the fourth protrusion.

At least a portion of the first bracket may include a dielectric material, and a thickness, in the first direction, of each a first portion of the first bracket corresponding to the first recess, a second portion of the first bracket corresponding to the second recess, and a third portion of the first bracket corresponding to the third recess may be less than a thickness, in the first direction, of each of the first protrusion, the second protrusion, the third protrusion, and the fourth protrusion.

The antenna element of each of the first chip antenna, the second chip antenna, and the third chip antenna may include at least one of a conductive patch and a conductive pattern.

The first protrusion may be may contact at least one of a surface of the first chip antenna facing the first protrusion and a surface of the second chip antenna facing the first protrusion, and the second protrusion may contact at least one of a surface of the second chip antenna facing the second protrusion and a surface of the third chip antenna facing the second protrusion.

A width, in the third direction, of at least one of the first protrusion and the second protrusion may gradually increase toward the second direction.

The housing may provide a front surface of the electronic device, a rear surface of the electronic device, and a side surface of the electronic device, the first substrate surface may face the front surface, and the plurality of chip antennas may be configured to form a directional beam in the first direction.

The electronic device may further include a second bracket disposed between the first bracket and the rear surface and combined with the first bracket, the antenna structure may be disposed in a space between the first bracket and the second bracket.

The electronic device further includes a conductive bracket coupling the antenna structure to the second bracket, and the conductive bracket extends between the antenna structure and the second bracket.

The conductive bracket may include a support portion and at least one extension portion extending from the support portion and fixed to the second bracket, and at least a portion of the second substrate surface may be supported by the support portion.

The second bracket may include a metal material.

The electronic device may further include a display disposed between the first bracket and the front surface and visually exposed through the front surface, and the antenna structure may be located in the housing to correspond to a black matrix area of the display.

The housing may further include a lateral member providing the side surface, and the first bracket may be coupled to the lateral member or integrally formed with the lateral member.

At least one of the first chip antenna, the second chip antenna, and the third chip antenna may further include a rigid body formed of a dielectric material, and the antenna element may be disposed inside the rigid body and may be electrically coupled to at least one first conductive pad exposed to an outer surface of the rigid body.

The substrate may include at least one second conductive pad exposed to the first substrate surface, and the at least one second conductive pad may be electrically coupled to the wireless communication circuit disposed on the second substrate surface through a wiring structure.

At least one of the first chip antenna, the second chip antenna, and the third chip antenna may be fixed to the first substrate surface through a process of soldering the at least one first conductive pad and the at least one second conductive pad.

The wireless communication circuit may be disposed on the second substrate surface.

According to an aspect of the disclosure, an electronic device includes: a housing; an antenna structure disposed in an inner space of the housing, the antenna structure including: a substrate having a first substrate surface facing in a first direction and a second substrate surface facing in a second direction opposite to the first substrate surface, and a first chip antenna and a second chip antenna spaced apart from each other on the first substrate surface with a separation space of a first width, the first chip antenna including a first antenna element, and the second chip antenna including a second antenna element; a wireless communication circuit disposed in the inner space and configured to transmit or receive a radio signal in a selected or designated frequency band through the antenna structure; and a first bracket including a protrusion that protrudes in the second direction to correspond to the first substrate surface, the protrusion has a second width that is greater than the first width, and the protrusion is aligned, in a third direction perpendicular to the first direction, with the separation space between the first chip antenna and the second chip antenna and overlaps with the first chip antenna and the second chip antenna.

The first chip antenna may further include a first rigid body formed of a first dielectric material, the first antenna element may be disposed inside the first rigid body, the first antenna element may be electrically coupled to at least one first conductive pad exposed to an outer surface of the first rigid body, the second chip antenna may further include a second rigid body formed of a second dielectric material, the second antenna element may be disposed inside the second rigid body, the second antenna element may be electrically coupled to at least one second conductive pad exposed to an outer surface of the second rigid body, and the at least one first conductive pad and the at least one second conductive pad may be electrically coupled to the wireless communication circuit disposed on the second substrate surface.

The electronic device according to embodiments of the disclosure includes the antenna support structure for supporting a portion of the antenna through the bracket including a plurality of protrusions, thereby helping a heat dissipation action through a space between the protrusions. In addition, it is possible to reduce a degradation in radiation performance because regions of the bracket corresponding to the antenna elements are formed to have a thickness smaller than the surroundings.

In addition, various effects explicitly or implicitly appreciated through the disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
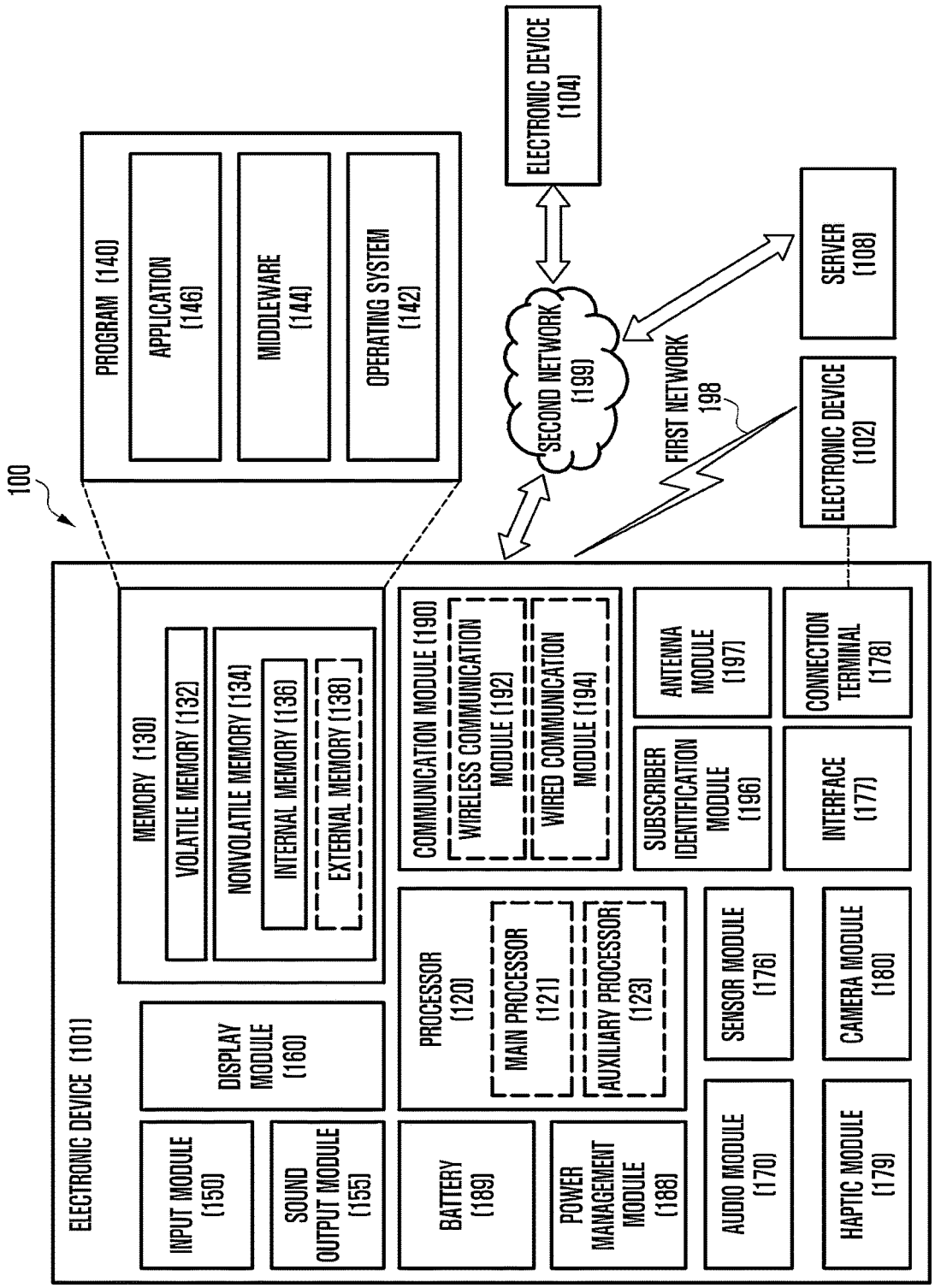
FIG. 1 is a block diagram illustrating an electronic device in a network environment, according to various embodiments of the disclosure.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. the non-volatile memory 134 may include internal memory 136 and external memory 138.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
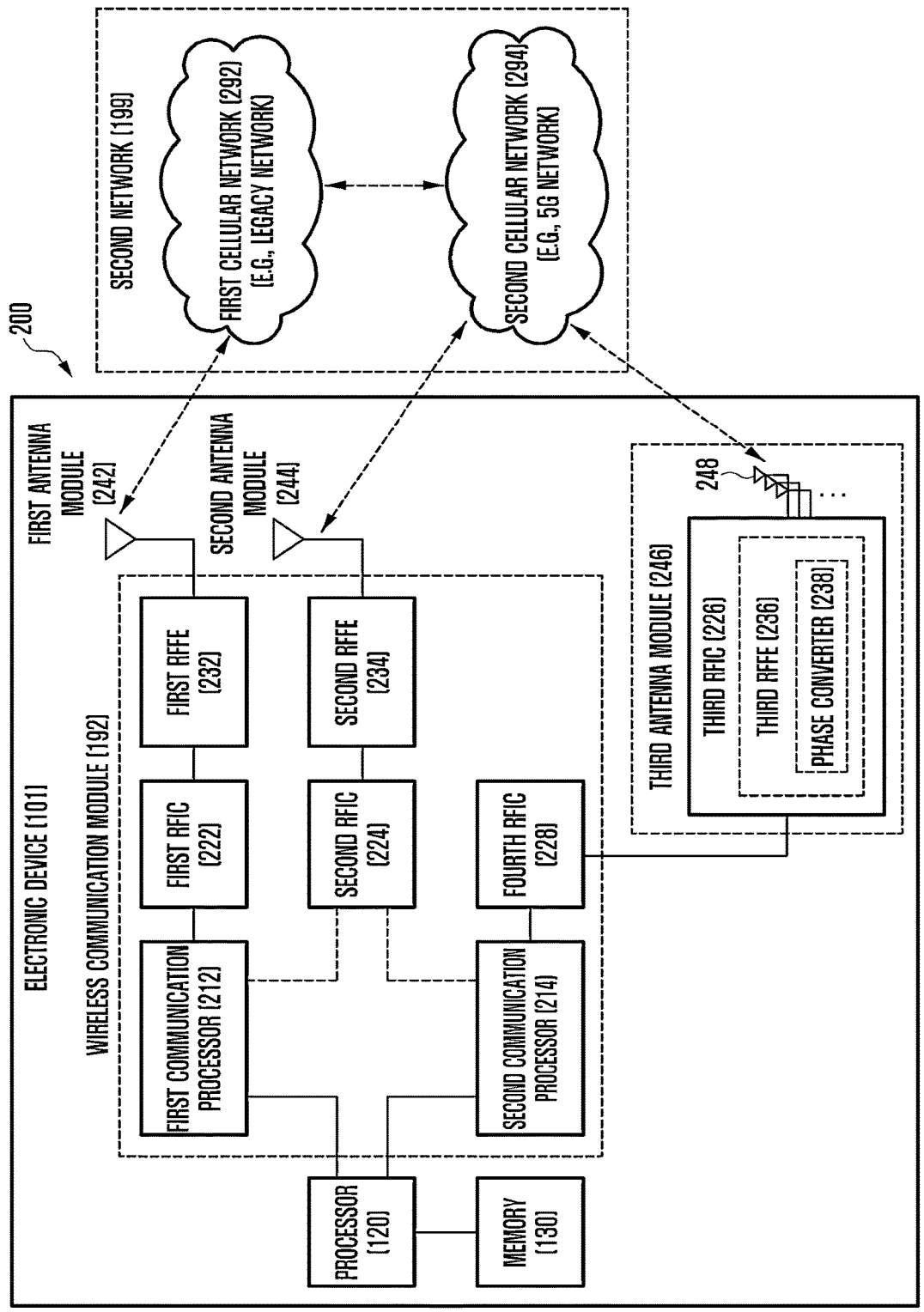
FIG. 2 is a block diagram illustrating an electronic device for supporting legacy network communication and 5G network communication, according to various embodiments of the disclosure.

FIG. 2 is a block diagram illustrating an example configuration of an electronic device in a network environment including a plurality of cellular networks according to an embodiment of the disclosure.

Referring to FIG. 2, the electronic device 101 a network environment 200 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel. According to various embodiments, the first cellular network may be a legacy network including a second generation (2G), third generation (3G), 4G, or long term evolution (LTE) network. The second communication processor 214 may include various processing circuitry and establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in third generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand-alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
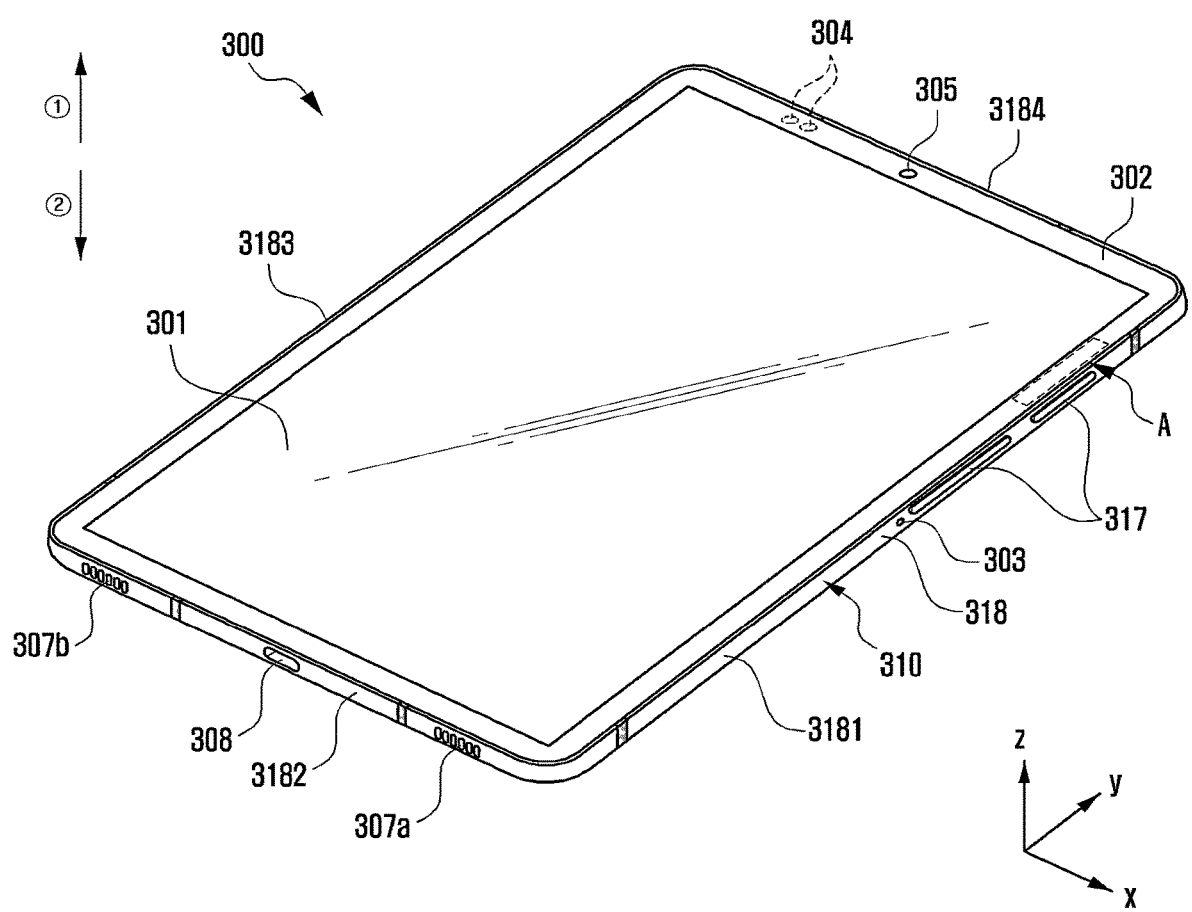
FIG. 3A is a front perspective view illustrating an electronic device, according to various embodiments of the disclosure.
Figure 3B:
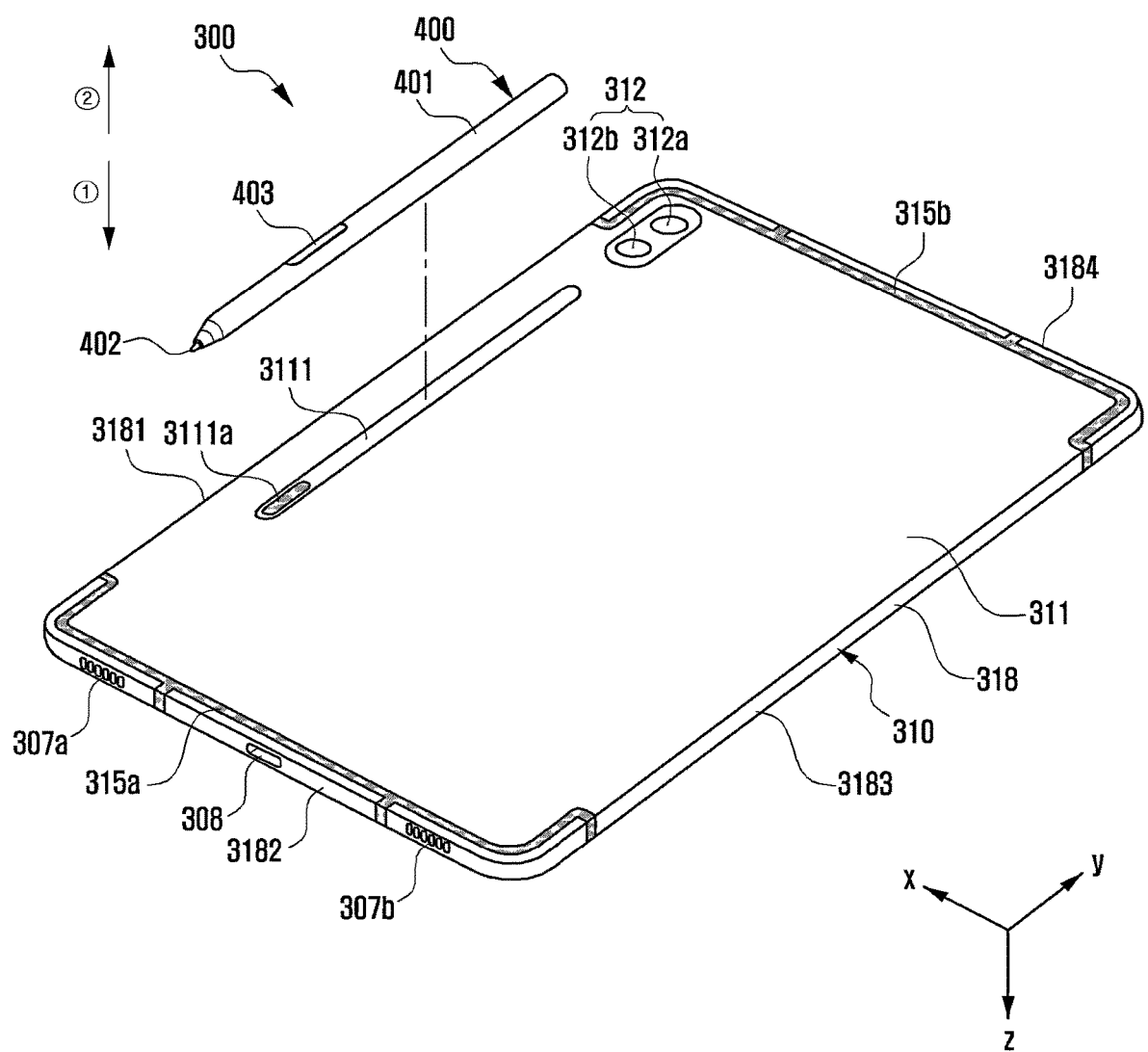
FIG. 3B is a rear perspective view illustrating the electronic device of FIG. 3A, according to various embodiments of the disclosure.

FIG. 3A is a front perspective view illustrating an electronic device, according to various embodiments of the disclosure. FIG. 3B is a rear perspective view illustrating the electronic device of FIG. 3A, according to various embodiments of the disclosure.

The electronic device 300 of FIGS. 3A and 3B may include or may be similar in many respects at least in part to the electronic device 101 of FIGS. 1 and 2 and may include additional features not mentioned above.

With reference to FIGS. 3A and 3B, the electronic device 300 may include a housing structure 310 (e.g., a housing) including a front cover 302 facing in a first direction (e.g., the positive z-axis direction), a rear cover 311 facing in a direction (e.g., the negative z-axis direction) opposite to the first direction, and a lateral member 318 (e.g., a lateral bezel structure) surrounding an inner space (e.g., the inner space 3001 in FIG. 4A) between the front cover 302 and the rear cover 311. According to an embodiment, the lateral member 318 may have a first side surface 3181 having a first length, a second side surface 3182 extending in a direction perpendicular to the first side surface 3181 and having a second length shorter than the first length, a third side surface 3183 extending parallel to the first side surface 3181 from the second side surface 3182 and having the first length, and a fourth side surface 3184 extending parallel to the second side surface 3182 from the third side surface 3183 and having the second length. According to an embodiment, the front cover 302 may be formed of a glass plate or polymer plate having various coating layers. According to an embodiment, the rear cover 311 may be formed of, for example, coated or tinted glass, ceramic, polymer, metal (e.g., aluminum, stainless steel (STS), or magnesium), or a combination of at least two of the above materials. However, the present disclosure is not limited in this regard. That is, the rear cover 311 may be formed of other materials and/or combinations of other materials.

According to an embodiment, the lateral member 318 may be combined with the front cover 302 and the rear cover 311 and formed as a lateral bezel structure including metal and/or polymer. In another embodiment, the rear cover 311 and the lateral members 318 may be integrally formed and include the same material (e.g., a metal material such as aluminum or magnesium).

According to various embodiments, the electronic device 300 may include at least one of a display 301, at least one input device 303, sound output devices 307a and 307b, a sensor module 304, camera modules 305 and 312 (e.g., 312a, 312b), a key input device 317, and a connector 308. In some embodiments, the electronic device 300 may omit at least one of the aforementioned components (e.g., the key input device 317) and/or include other components.

According to an embodiment, the display 301 may be visually exposed, for example, through a substantial portion of the front cover 302. In another embodiment, the display 301 may be visually exposed through substantially the entire area of the front cover 302. In still another embodiment, the edges of the display 301 may be formed substantially the same as the outer shape of the front cover 302. In yet another embodiment, in order to expand the area where the display 301 is exposed, a gap between the periphery of the display 301 and the periphery of the front cover 302 may be substantially the same.

In further another embodiment, the display 301 may have a recess and/or opening formed in a portion of a screen display area, and at least one of the aforementioned components may be disposed to be aligned with the recess or opening in the inner space of the electronic device 300. In still another embodiment, on the rear surface of the screen display area (e.g., active area) of the display 301 in the inner space (e.g., the inner space 3001 in FIG. 4A) of the electronic device 300, at least one of an audio module, the sensor module 304, the camera module 305, a fingerprint sensor, and/or a light emitting element may be disposed. In yet another embodiment, the display 301 may be disposed to be combined with or adjacent to a touch sensing circuit, a pressure sensor capable of measuring the intensity (pressure) of a touch, and/or an electromagnetic induction panel (e.g., a digitizer) for detecting an electronic pen (e.g., stylus pen) of a magnetic field type.

According to various embodiments, the input device 303 may include at least one microphone module 303. In some embodiments, the input device 303 may include a plurality of microphone modules 303 disposed at different locations to detect the direction of sound. The sound output devices 307a and 307b may include speaker modules. In another embodiment, the speaker modules 307a and 307b may include an external speaker and/or a receiver configured to provide and/or receive audio during a telephone/video call.

According to various embodiments, the at least one sensor module 304 may generate an electrical signal and/or data value corresponding to an internal operating state or an external environmental state of the electronic device 300. The at least one sensor module 304 may include, for example, at least one of a proximity sensor, a fingerprint sensor, a heart rate monitor (HRM) sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, and an illuminance sensor. However, the present disclosure is not limited in this regard. For example, the at least one sensor module 304 may include other sensors and/or combination of sensors.

According to various embodiments, the key input device 317 may be disposed through the lateral member 318 of the housing structure 310. In another embodiment, the electronic device 300 may not include some or all of the key input devices 317, and the functionality of the key input device 317 may be provided in the form of a soft key displayed on the display 301. In another embodiment, the key input device 317 may be implemented using a pressure sensor included in the display 301. In another embodiment, the key input device 317 may include at least one pressure-responsive key that is disposed inside the electronic device 300 and uses a strain gauge that measures a pressure change by pressure on the lateral member 318. According to an embodiment, the connector hole 308 may accommodate a connector (e.g., a USB connector or an IF connector) for transmitting and/or receiving power, data, and/or sound signals to and/or from an external electronic device.

According to various embodiments, the camera modules 305 and 312 (e.g., 312a, 312b) may include a front camera module 305 disposed to be exposed to the outside through the front cover 302 of the electronic device 300, and a rear camera module 312 (e.g., 312a, 312b) disposed to be exposed to the outside through the rear cover 311. According to an embodiment, the camera modules 305 and 312 (e.g., 312a, 312b) may include one and/or a plurality of lenses, an image sensor, and/or an image signal processor. According to an embodiment, at least two rear camera modules 312a and 312b may be disposed adjacently as one camera module assembly 312. For example, a pair of camera modules 312a and 312b of the camera module assembly 312 may perform a dual camera function for general shooting, wide-angle shooting, and/or ultra-wide-angle shooting.

According to various embodiments, the electronic device 300 may include an electronic pen 400 detachably disposed on a pen mounting part 3111 provided on at least a portion of the rear cover 311. According to an embodiment, the electronic pen 400 may include a hollow pen housing 401 having a length and a pen tip 402 disposed at an end of the pen housing 401. According to an embodiment, the electronic pen 400 may include a key button 403 disposed on at least a portion of the pen housing 401. According to an embodiment, the electronic pen 400 may be attached to the pen mounting part 3111 using the magnetic force of at least one magnet. According to an embodiment, the electronic pen 400 may include a battery disposed inside the pen housing 401 and used for short-range wireless communication (e.g., Bluetooth communication). According to an embodiment, the electronic pen 400 may include a coil member for electromagnetic induction and/or wireless charging. Using the coil member, the battery may be charged through a wireless charging unit 3111a disposed in the pen mounting part 3111. According to an embodiment, the detection scheme of the electronic pen 400 may include an electromagnetic resonance (EMR) scheme, an active electrical stylus (AES) scheme, and/or an electric coupled resonance (ECR) scheme. In some embodiments, the pen mounting portion 3111 and the electronic pen 400 may be omitted.

According to various embodiments, the electronic device 300 may include at least one unit conductive member segmented through non-conductive members 315a and 315b (e.g., polymer) disposed in at least a portion of the rear cover 311 and/or the lateral member 318. The segmented unit conductive member may be used as an antenna radiator operating in at least one frequency band.

According to an embodiment of the disclosure, the electronic device 300 may include an antenna structure (e.g., the antenna structure 500 in FIG. 5A) for operating in a designated frequency band (e.g., a band of about 3 GHz to 300 GHz). According to an embodiment, the antenna structure 500 may include a substrate (e.g., the substrate 590 in FIG. 5A) and an array antenna (e.g., the array antenna AR in FIG. 5A) including a plurality of antennas (e.g., the chip antennas 510, 520, 530, and 540 in FIG. 5A) disposed on the substrate 590. According to an embodiment, the antenna structure 500 may be disposed to form a directional beam in the direction (e.g., the z-axis direction) of the front cover 302 in the inner space (e.g., the inner space 3001 in FIG. 4A) of the electronic device 300. According to an embodiment, the antenna structure 500 may be arranged to form a directional beam through a black matrix (BM) area of the display 301 in the vicinity (e.g., area A) of the first side surface 3181. In some embodiments, the antenna structure 500 may also be disposed in the vicinity of the second side surface 3182, the third side surface 3183, and/or the fourth side surface 3184, and a plurality of antenna structures may also be arranged near at least one of the first side surface 3181, the second side surface 3182, the third side surface 3183, or the fourth side surface 3184. In some embodiments, the antenna structure 500 may also be arranged to form a directional beam in a direction (e.g., the x-axis direction, the y-axis direction, the negative x-axis direction, or the negative y-axis direction) of the lateral member 318 in the inner space 3001 of the electronic device 300. In some embodiments, the antenna structure 500 may be disposed to form a directional beam in the direction (e.g., the negative z-axis direction) of the rear cover in the inner space 3001 of the electronic device 300.

Figure 4A:
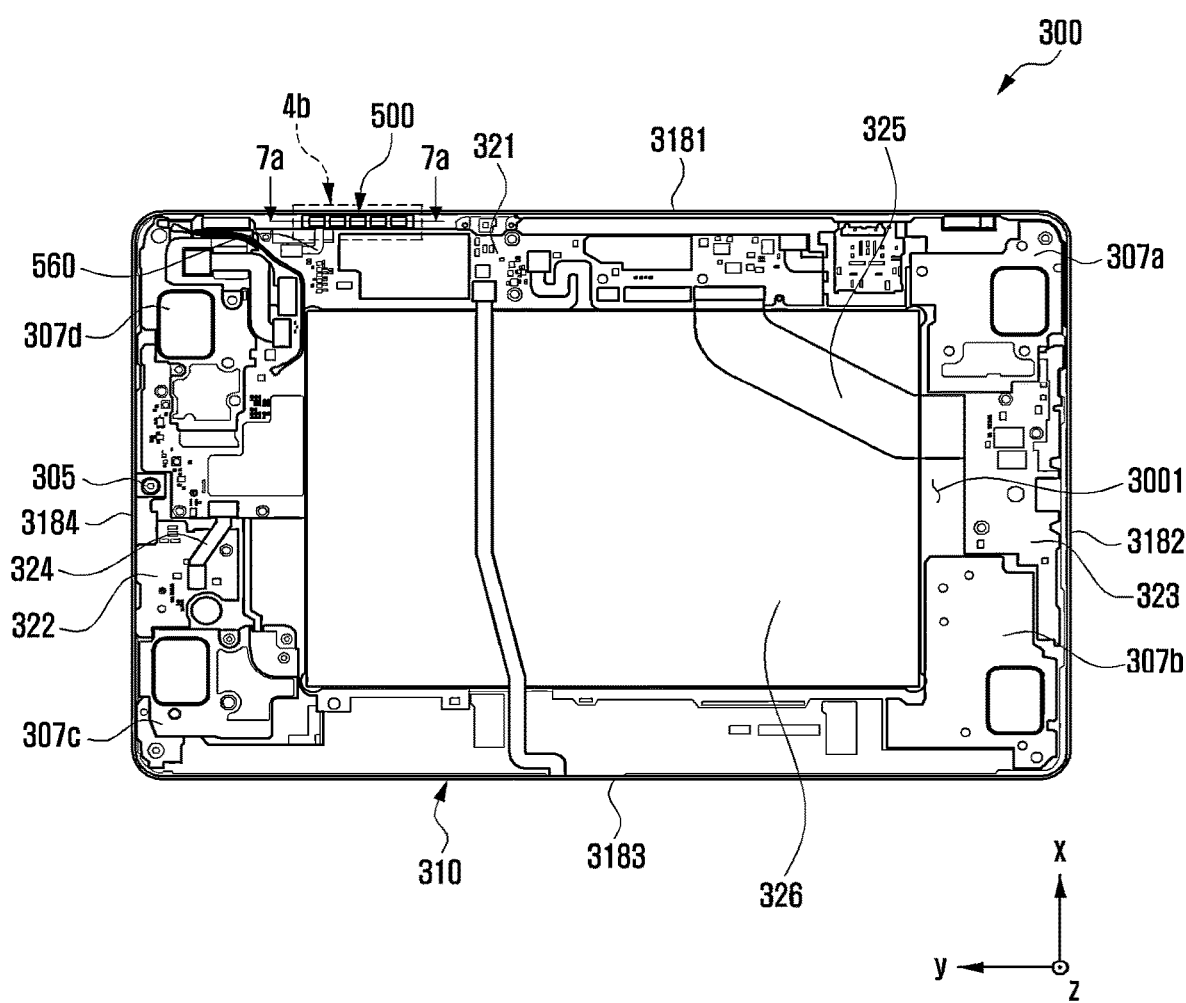
FIG. 4A is a diagram illustrating internal components of an electronic device, according to various embodiments of the disclosure.
Figure 4B:
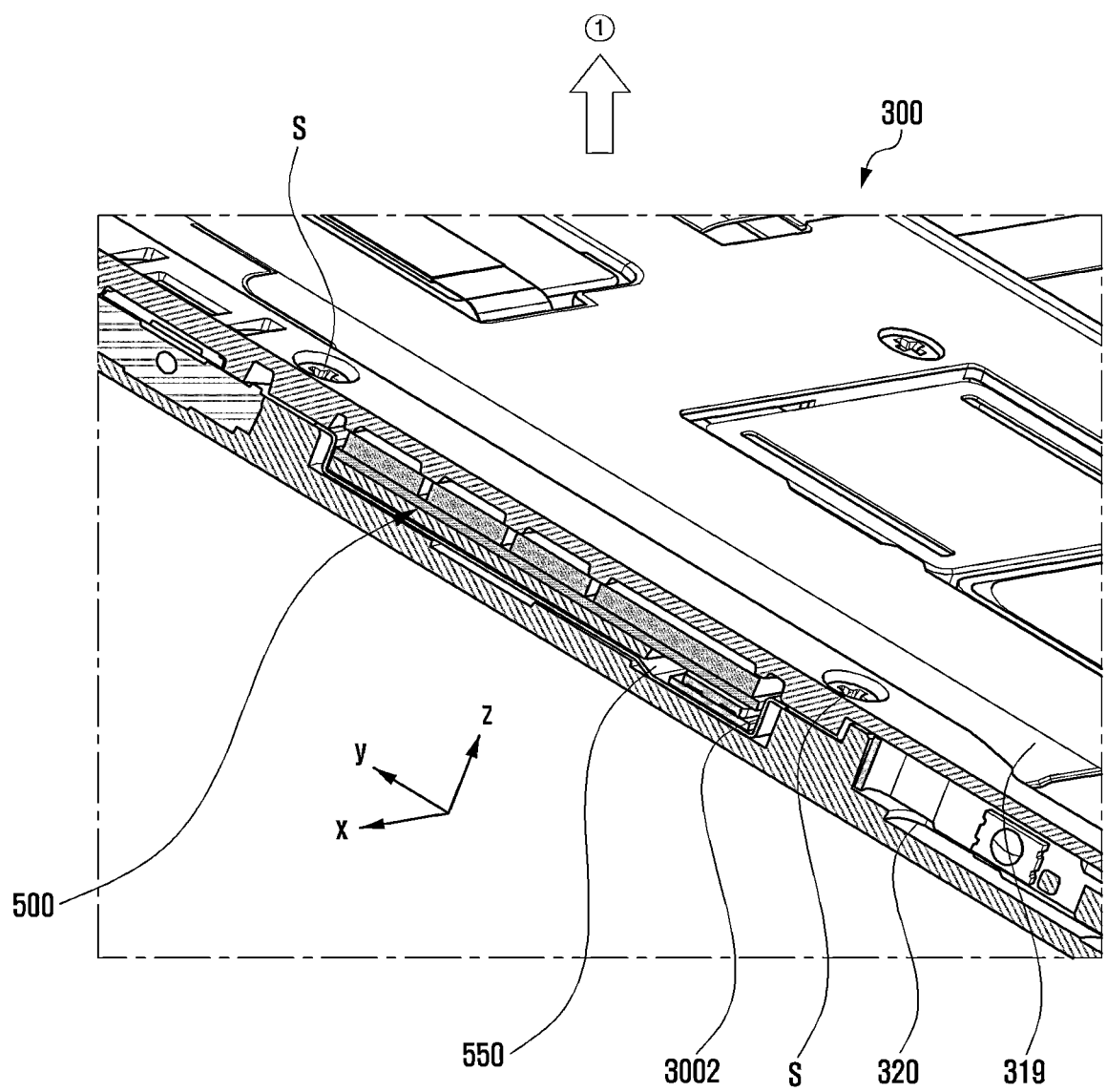
FIG. 4B is a partially cut-away perspective view illustrating a region 4b of FIG. 4A, according to various embodiments of the disclosure.

FIG. 4A is a diagram illustrating internal components of an electronic device 300, according to various embodiments of the disclosure. FIG. 4B is a partially cut-away perspective view illustrating a region 4b of FIG. 4A, according to various embodiments of the disclosure.

FIG. 4A is a diagram illustrating an inner space 3001 of the electronic device 300 in a state where the display 301 and the front cover 302 of the electronic device 300 shown in FIG. 3A are removed.

With reference to FIGS. 4A and 4B, the electronic device 300 may include a front cover (e.g., the front cover 302 in FIG. 3A), a rear cover (e.g., the rear cover 311 in FIG. 3B) facing a direction opposite to the front cover 302, and a lateral member 318 (see FIG. 3A) surrounding the inner space 3001 between the front cover 302 and the rear cover 311. According to an embodiment, the electronic device 300 may include a battery 326 disposed in the inner space 3001. According to an embodiment, the electronic device 300 may include a printed circuit board 321 (e.g., a main board) disposed to surround at least a portion of the battery 326. In another embodiment, the printed circuit board 321 may be disposed to overlap at least in part with the battery 326.

According to an embodiment, the electronic device 300 may include a first sub-board 322 and a second sub-board 323 each of which is disposed at a distance from the printed circuit board 321 around the battery 326. According to an embodiment, the first sub-board 322 and the second sub-board 323 may be electrically connected through flexible printed circuit boards (FPCBs) 324 and 325. According to an embodiment, the electronic device 300 may include one or more speaker modules 307a, 307b, 307c, and 307d disposed around the battery 326 at regular intervals in the inner space 3001. According to an embodiment, four speaker modules 307a, 307b, 307c, and 307d may be respectively disposed near corners in the inner space 3001 of the electronic device 300, but this is not a limitation. That is, the four speaker modules 307a, 307b, 307c, and 307d may be disposed in other locations within electronic device 300.

According to various embodiments, the electronic device 300 may include the antenna structure 500 disposed in the inner space 3001. According to an embodiment, the antenna structure 500 may be disposed near the first side surface 3181 in the inner space 3001 and electrically connected (e.g., coupled) to the printed circuit board 321 via an electrical connection member 560 (e.g., a flexible RF cable (FRC)). In some embodiments, the antenna structure 500 may also be disposed near the second side surface 3182, the third side surface 3183, or the fourth side surface 3184.

According to various embodiments, the electronic device 300 may include a first bracket 319 (e.g., the front bracket) disposed in the inner space 3001 and a second bracket 320 (e.g., the rear bracket) disposed to correspond at least in part to the first bracket 319. According to an embodiment, the first bracket 319 may be formed of an injection-molded product of a dielectric material. According to an embodiment, the second bracket 320 may be formed of a metal material. In some embodiments, the second bracket 320 may be formed of a dielectric material. The dielectric material may include, but is not limited to, a non-metallic material. The dielectric material of the non-metallic material may have a permittivity capable of reducing deterioration of antenna radiation performance and/or radio transmission/reception performance of the antenna structure 500.

In some embodiments, the dielectric material may include a metallic material. The dielectric material of the metal material may have a permittivity capable of reducing deterioration of antenna radiation performance or radio transmission/reception performance of the antenna structure 500. According to an embodiment, the first bracket 319 may be integrally formed with the lateral member 318 and may extend from the lateral member 318 to the inner space 3001. In some embodiments, the first bracket 319 may be disposed separately from the lateral member 318. According to an embodiment, the antenna structure 500 may be disposed in a space 3002 formed by the first bracket 319 and the second bracket 320. According to an embodiment, the antenna structure 500 may include a substrate (e.g., the substrate 590 in FIG. 5A) and an array antenna (e.g., the array antenna AR in FIG. 5A) including a plurality of antennas (e.g., the chip antennas 510, 520, 530, and 540 in FIG. 5A) disposed on the substrate 590. According to an embodiment, the antenna structure 500 may be disposed such that a first substrate surface (e.g., the first substrate surface 5901 in FIG. 5A) of the substrate 590 faces the first bracket 319 and a second substrate surface (e.g., the second substrate surface 5902 in FIG. 5A) faces the second bracket 320. For example, the antenna structure 500 may be disposed in such a way that the substrate 590 is fixed to the second bracket 320.

According to an embodiment of the disclosure, the electronic device 300 may include an antenna support structure for efficiently supporting the antenna structure 500. For example, in the antenna support structure, a plurality of protrusions (e.g., the protrusions 3195 in FIG. 7A) formed on at least a portion of the first bracket 319 are arranged to support or correspond to a part of the outer surfaces of chip antennas (e.g., the chip antennas 510, 520, 530, and 540 in FIG. 5A) disposed on the substrate 590 of the antenna structure 500, thereby providing heat dissipation spaces (e.g., the spaces 3191, 3192, 3193, and 3194 in FIG. 7A) between the plurality of protrusions 3195. These spaces reduce the thickness of corresponding regions of the first bracket 319, and may thereby reduce a degradation in the radiation performance of the antenna structure 500.

Figure 5A:
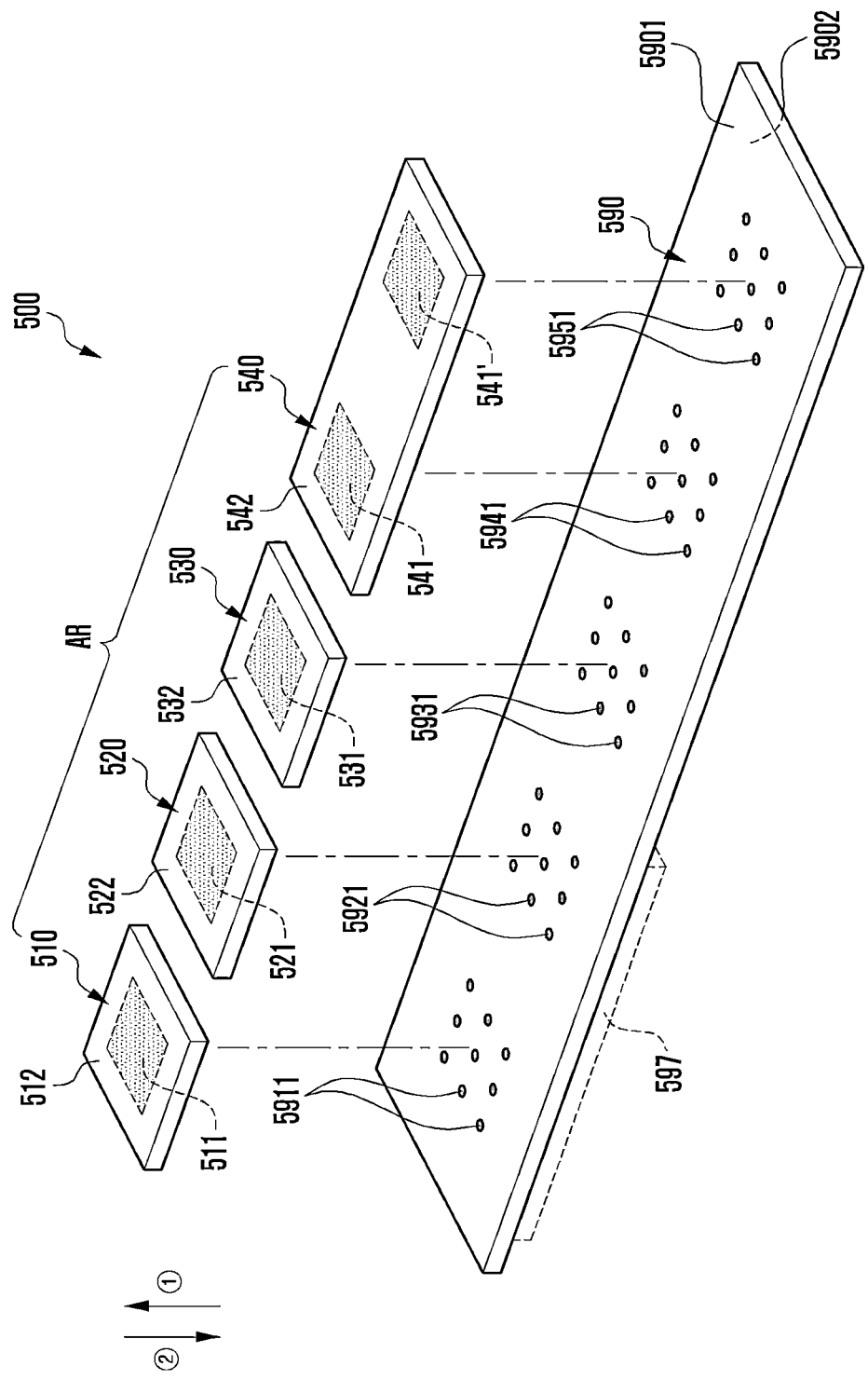
FIG. 5A is an exploded perspective view illustrating an antenna structure, according to various embodiments of the disclosure.
Figure 5B:
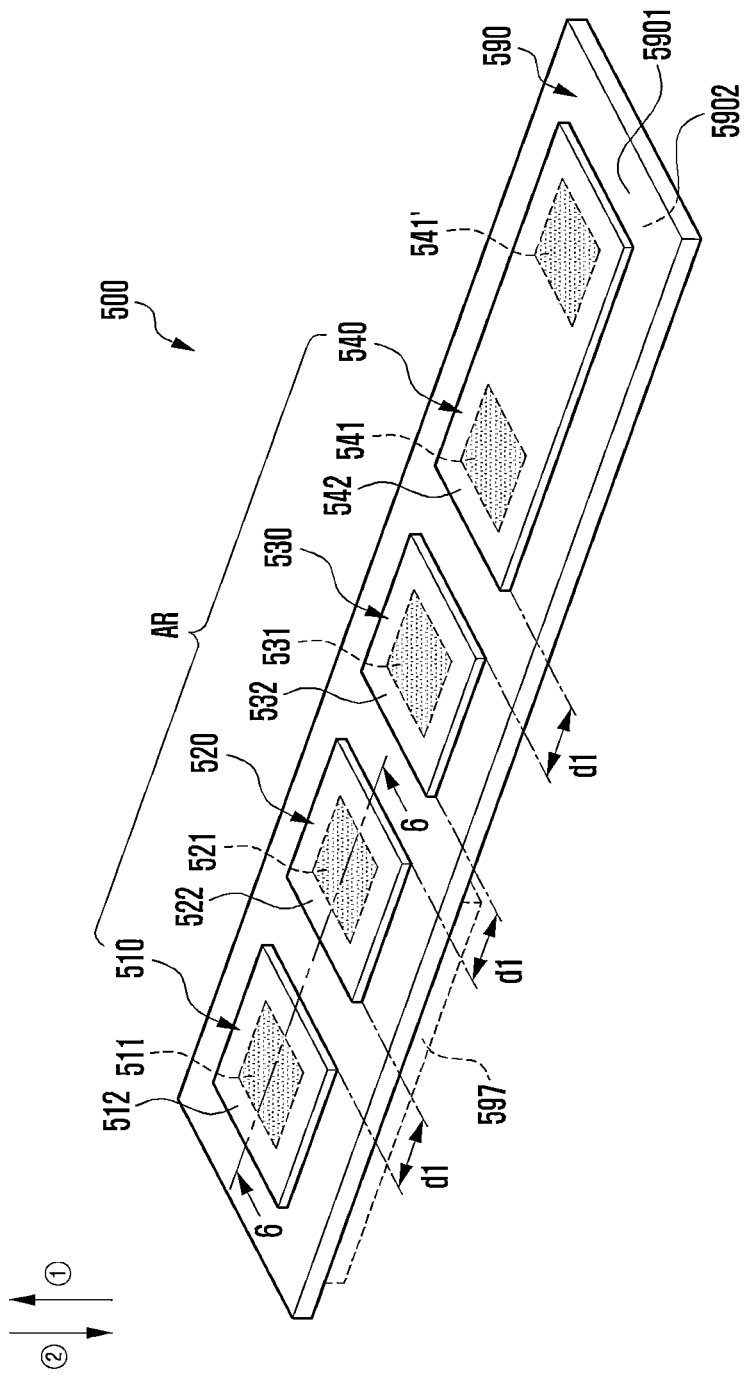
FIG. 5B is a combined perspective view illustrating an antenna structure, according to various embodiments of the disclosure.

FIG. 5A is an exploded perspective view illustrating an antenna structure, according to various embodiments of the disclosure. FIG. 5B is a combined perspective view illustrating an antenna structure, according to various embodiments of the disclosure.

The antenna structure 500 of FIGS. 5A and 5B may be similar in many respects at least in part to the third antenna module 246 of FIG. 2 and may include additional features not mentioned above.

With reference to FIGS. 5A and 5B, the antenna structure 500 (e.g., an antenna module) may include the array antenna AR including the plurality of chip antennas (e.g., 510, 520, 530, and 540). According to an embodiment, the plurality of chip antennas (e.g., 510, 520, 530, and 540) may be disposed on the substrate 590 (e.g., a printed circuit board) in a surface mount device (SMD) method. The plurality of chip antennas (e.g., 510, 520, 530, and 540) may be arranged in one direction when viewed from above the first substrate surface 5901 (e.g., a direction perpendicular to the first direction). A first separation space between the first chip antenna 510 and the second chip antenna 520, a second separation space between the second chip antenna 520 and the third chip antenna 530, and a third separation space between the third chip antenna 530 and the fourth chip antenna 540 may have a first width d1 (or a first interval or a first separation distance) in the direction in which the plurality of chip antennas (e.g., 510, 520, 530, and 540) are arranged. In some embodiments, any one of the first, second, and third separation spaces may have a different width from the others in the direction in which the plurality of chip antennas (e.g., 510, 520, 530, and 540) are arranged.

According to an embodiment, the substrate 590 may have the first substrate surface 5901 facing in the first direction (direction ①) and the second substrate surface 5902 facing in the second direction (direction ②) opposite to the first substrate surface 5901.

According to various embodiments, the plurality of chip antennas (e.g., 510, 520, 530, and 540) may be disposed through the first substrate surface 5901. For example, the plurality of chip antennas (e.g., 510, 520, 530, and 540) may be electrically connected (e.g., coupled) to the first substrate surface 5901 of the substrate 590 through an electrical bonding process such as soldering. According to an embodiment, the antenna structure 500 may be disposed in the inner space 3001 of the electronic device 300 such that the first substrate surface 5901 of the substrate 590 faces the direction of the front cover (e.g., the front cover 302 in FIG. 3A). Alternatively or additionally, the antenna structure 500 may be disposed to face the direction of the lateral member (e.g., the lateral member 318 in FIG. 3A) or the direction of the rear cover (e.g., the rear cover 311 in FIG. 3B).

According to various embodiments, the array antenna AR may include the first chip antenna 510 including a first conductive patch 511 as an antenna element disposed in an inner space of a first rigid body 512, the second chip antenna 520 including a second conductive patch 521 as an antenna element disposed in an inner space of a second rigid body 522, the third chip antenna 530 including a third conductive patch 531 as an antenna element disposed in an inner space of a third rigid body 532, and the fourth chip antenna 540 including a fourth conductive patch 541 and a fifth conductive patch 541' as antenna elements disposed in an inner space of a fourth rigid body 542. According to an embodiment, the rigid bodies 512, 522, 532, and 542 may be formed of a material (e.g., a ceramic material) having a high permittivity (e.g., a permittivity in the range of 4 to 7). According to an embodiment, the conductive patches (e.g., 511, 521, 531, 541, and 541') may be replaced with at least one conductive pattern disposed on each of the rigid bodies 512, 522, 532, and 542. In some embodiments, the antenna structure may include the plurality of conductive patches (e.g., 511, 521, 531, 541, and 541') disposed in the space between the first and second substrate surfaces 5901 and 5902 of the substrate 590 without the chip antennas (e.g., 510, 520, 530, and 540), and may include slits formed lower than the first substrate surface 5901 between the conductive patches (e.g., 511, 521, 531, 541, and 541').

Figure 6:
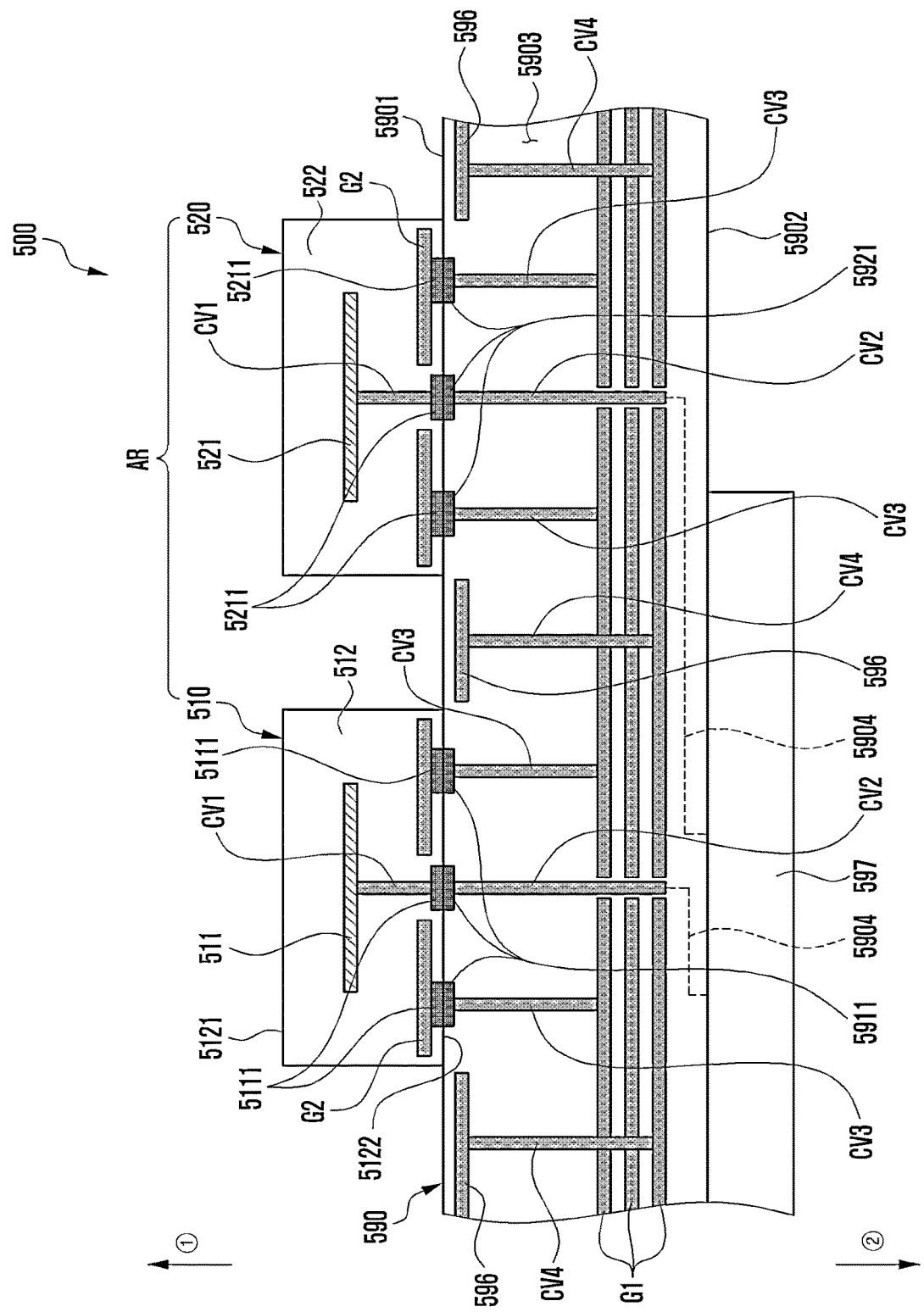
FIG. 6 is a cross-sectional view illustrating a portion of an antenna structure viewed along line 6-6 of FIG. 5B, according to various embodiments of the disclosure.

FIG. 6 is a cross-sectional view illustrating a portion of an antenna structure viewed along line 6-6 of FIG. 5B, according to various embodiments of the disclosure.

Although the arrangement structure of the first and second chip antennas 510 and 520 disposed on the substrate 590 is described and shown in FIG. 6, the remaining chip antennas 530 and 540 disposed on the substrate 590 may also have substantially the same arrangement structure.

With reference to FIG. 6, the antenna structure 500 may include the substrate 590 having a plurality of insulating layers 5903, and the first and second chip antennas 510 and 520, as the array antenna AR, disposed on the substrate 590. According to an embodiment, the substrate 590 may have the first substrate surface 5901 facing in the first direction (direction ①) and the second substrate surface 5902 facing in the second direction (direction ②) opposite to the first substrate surface 5901. According to an embodiment, the substrate 590 may have a ground layer G1 disposed on at least some of the plurality of insulating layers 5903.

According to various embodiments, the first chip antenna 510 may include the first rigid body 512 made of a high dielectric material (e.g., ceramic), the first conductive patch 511 disposed in the inner space of the first rigid body 512, and a ground layer G2 disposed between the first conductive patch 511 and the substrate 590 in the inner space of the first rigid body 512. According to an embodiment, the first rigid body 512 may include a material having a permittivity in the range of 4 to 9. For example, the first rigid body 512 may be formed of a ceramic material (e.g., low temperature co-fired ceramics (LLCC)) having a higher permittivity than that of the substrate 590 (e.g., the printed circuit board). According to an embodiment, the second chip antenna 520 may include the second rigid body 522 made of a high dielectric material (e.g., ceramic), the second conductive patch 521 disposed in the inner space of the second rigid body 522, and a ground layer G2 disposed between the second conductive patch 521 and the substrate 590 in the inner space of the second rigid body 522. According to an embodiment, in the inner space of the first rigid body 512, the first conductive patch 511 may be electrically connected to at least one first conductive pad 5111 exposed to a second rigid body surface 5122 facing in the opposite direction to a first rigid body surface 5121 through a first electrical connection structure CV1.

According to various embodiments, the substrate 590 may include at least one second conductive pad 5911 disposed to be exposed to the first substrate surface 5901. According to an embodiment, the at least one second conductive pad 5911 may be electrically connected to a wireless communication circuit 597 (e.g., RFIC) disposed on the second substrate surface 5902 through a second electrical connection structure CV2 and a wiring structure 5904 which are disposed in or on the insulating layer 5903 of the substrate 590. According to an embodiment, the ground layer G2 disposed in the inner space of the first rigid body 512 may be electrically connected to the ground layer G1 of the substrate 590 through the at least one first conductive pad 5111 exposed to the second rigid body surface 5122, the at least one second conductive pad 5911 disposed on the substrate 590, and a third electrical connection structure CV3 (e.g., a conductive via) disposed in the insulating layer 5903 of the substrate 590. Therefore, when the first chip antenna 510 is disposed on the first substrate surface 5901 of the substrate 590 and the at least one first conductive pad 5111 is bonded to the at least one second conductive pad 5911 (e.g., through soldering), the first conductive patch 511 may be electrically connected to the wireless communication circuit 597.

According to various embodiments, in the second chip antenna 520, when at least one conductive pad 5211 exposed to the outer surface of the second rigid body 522 is electrically connected to a conductive pad 5921 exposed to the first substrate surface, the second conductive patch 521 in the inner space of the second rigid body 522 may be electrically connected to the wireless communication circuit 597 through the first electrical connection structure CV1, the conductive pads 5211 and 5921, the second electrical connection structure CV2, and the wiring structure 5904. According to an embodiment, the electrical connection structures CV1, CV2, and CV3 may include conductive vias. In some embodiments, the ground layer G2 disposed in the rigid bodies 512 and 522 may be omitted.

According to various embodiments, the antenna structure 500 may include, in the substrate 590, conductive walls CV4 disposed between the chip antennas 510 and 520 and having a length in a vertical direction. According to an embodiment, the conductive walls CV4 may improve isolation between the chip antennas 510 and 520. According to an embodiment, the antenna structure 500 may include, in the substrate 590, a conductive layer 596 disposed to surround the chip antennas 510 and 520 when viewed from above the first substrate surface 5901. According to an embodiment, the conductive layer 596 may potentially reduce mutual interference between the chip antennas 510 and 520 and may reduce a surface current flowing on the substrate surface. According to an embodiment, the conductive layer 596 may be disposed, in the insulating layer 5903 of the substrate 590, at a position close to the first substrate surface 5901 or be exposed to the first substrate surface 5901. According to an embodiment, the conductive walls CV4 and the conductive layer 596 may be electrically connected to the ground layer G1 of the substrate 590. In some embodiments, the conductive walls CV4 and the conductive layer 596 may be omitted.

According to various embodiments, the third chip antenna 530 and the fourth chip antenna 540 may have substantially the same structure as the first chip antenna 510, be disposed on the substrate 590 in the same manner, and be electrically connected to conductive pads (e.g., the conductive pads 5931, 5941, and 5951 in FIG. 5A) disposed to be exposed to the first substrate surface 5901 of the substrate 590.

According to an embodiment, the wireless communication circuit 597 may be configured to transmit and/or receive a radio signal in the range of about 3 GHz to 300 GHz through the array antenna AR. According to an embodiment, the wireless communication circuit 597 may be configured to operate in a frequency band (e.g., mmWave band) ranging from about 25 GHz to 45 GHz through the array antenna AR. In some embodiments, the wireless communication circuit 597 may be configured to operate in a frequency band of about 60 GHz (e.g., the 802.11 ay band) via the array antenna AR. In some embodiments, the wireless communication circuit 597 may be disposed at a location spaced apart from the substrate 590 in the inner space (e.g., the inner space 3001 in FIG. 4A) of the electronic device (e.g., the electronic device 300 in FIG. 4A), and be electrically connected to the substrate 590 through an electrical connection member (e.g., a FRC). For example, the wireless communication circuit 597 may be disposed on the printed circuit board (e.g., the PCB 321 in FIG. 4A) of the electronic device (e.g., the electronic device 300 in FIG. 4A).

The above-described embodiments of the disclosure relate to the antenna structure 500 in which four chip antennas (e.g., 510, 520, 530, and 540) are disposed on the substrate 590 and operate as the array antenna AR, but this is not a limitation. For example, the antenna structure 500 may include two, three, five, or more chip antennas disposed on the substrate 590 and operating as the array antenna AR. In some embodiments, two conductive patches 541 and 541' are disposed in one chip antenna 540, but this is not a limitation. For example, three or more conductive patches may be disposed in one chip antenna. In some embodiments, the antenna structure 500 may operate as a dual polarization array antenna by allowing the conductive patches (e.g., 511, 521, 531, 541, and 541') included in the plurality of chip antennas (e.g., 510, 520, 530, and 540) to include additional feed points disposed through an electrical connection structure of at least one conductive pad.

Figure 7A:
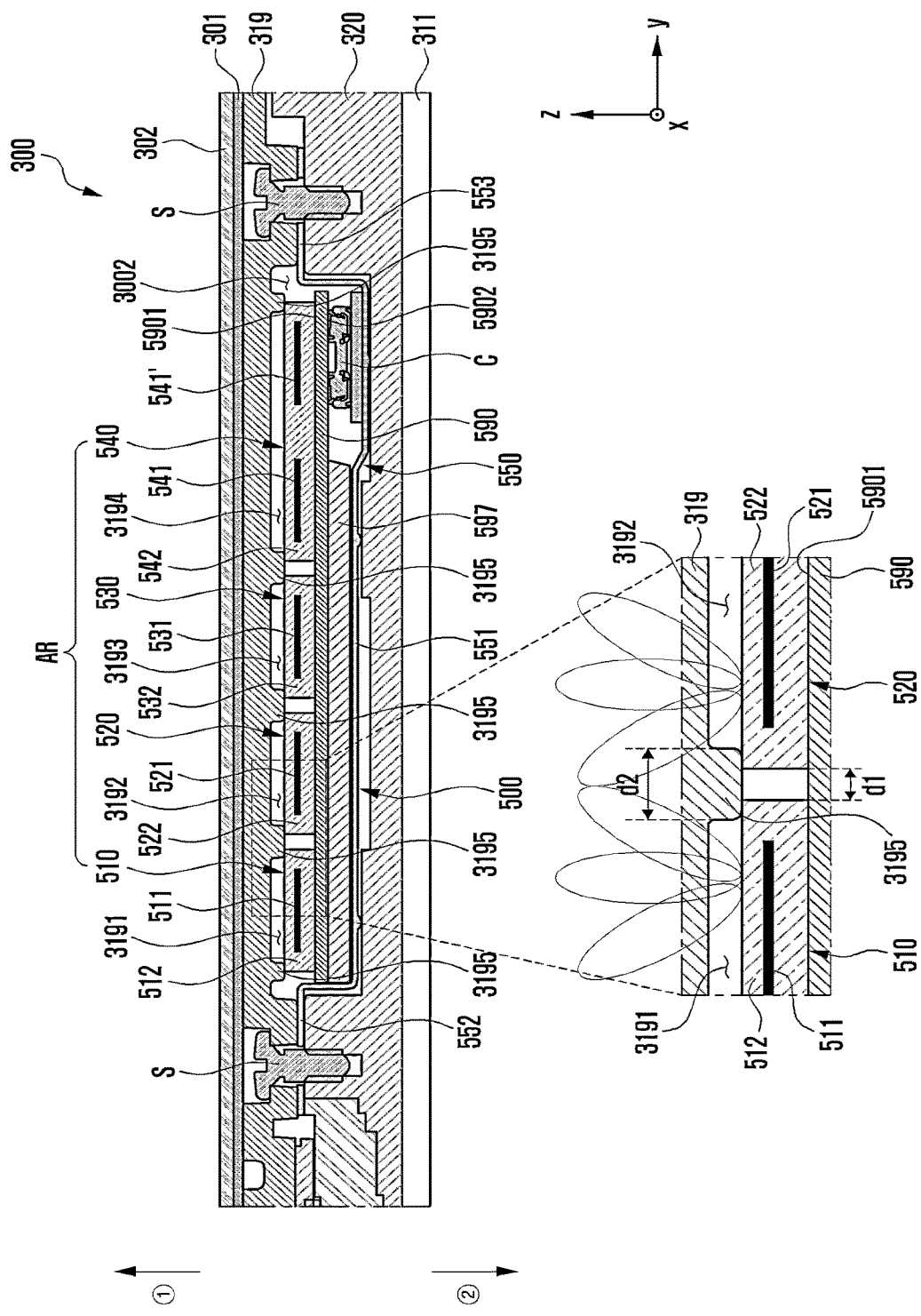
FIG. 7A is a cross-sectional view illustrating a portion of an electronic device viewed along line 7a-7a of FIG. 4A, according to various embodiments of the disclosure.
Figure 7B:
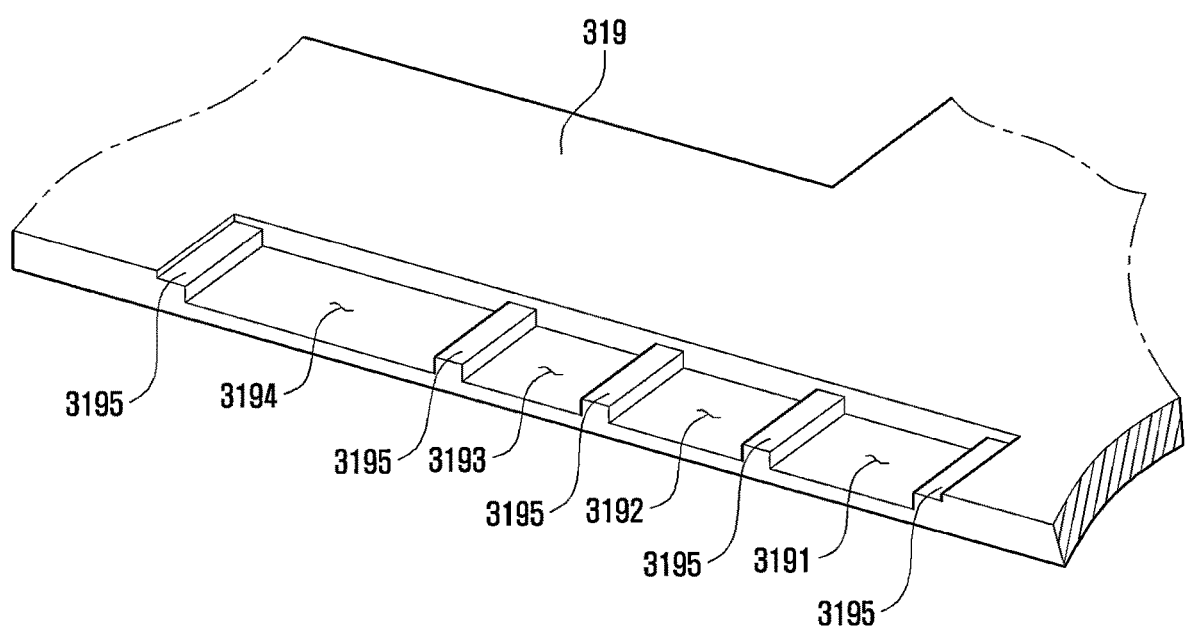
FIG. 7B is a perspective view illustrating a portion of a first bracket, according to various embodiments of the disclosure.

FIG. 7A is a cross-sectional view illustrating a portion of an electronic device viewed along line 7a-7a of FIG. 4A, according to various embodiments of the disclosure. FIG. 7B is a perspective view illustrating a portion of a first bracket, according to various embodiments of the disclosure.

With reference to FIGS. 7A and 7B, the electronic device 300 may include a housing structure (e.g., the housing structure 310 in FIG. 3A) (e.g., a housing) including a front cover 302 facing in the first direction (direction ①) (e.g., the z-axis direction), a rear cover 311 facing in the second direction (direction ②) (e.g., the negative z-axis direction) opposite to the front cover 302, and a lateral member (e.g., the lateral member 318 in FIG. 3A) disposed to surround an inner space 3001 between the front cover 302 and the rear cover 311. According to an embodiment, the electronic device 300 may include a first bracket 319 (e.g., front bracket) disposed in the inner space 3001 and a second bracket 320 (e.g., rear bracket) combined with the first bracket 319. According to an embodiment, the first bracket 319 may be a support member and may be integrally formed with the lateral member 318. In some embodiments, the first bracket 319 and the lateral member 318 may be separated from and structurally combined with each other. According to an embodiment, the electronic device 300 may include a display 301 disposed between the first bracket 319 and the front cover 302 and disposed to be visible from the outside through at least a portion of the front cover 302. According to an embodiment, the display 301 may be disposed to be supported by at least a portion of the first bracket 319.

According to various embodiments, the electronic device 300 may include an antenna structure 500 disposed in the inner space 3001 and disposed to form a directional beam in the first direction (direction ①) through at least a portion of the front cover 302. According to an embodiment, the antenna structure 500 may be disposed through a space 3002 between the first bracket 319 and the second bracket 320. According to an embodiment, the antenna structure 500 may include a substrate 590 having a first substrate surface 5901 facing in the first direction (direction ①) and a second substrate surface 5902 facing in the second direction (direction ②)), and an array antenna AR including a plurality of chip antennas (e.g., 510, 520, 530, and 540) arranged at predetermined intervals on the first substrate surface 5901. According to an embodiment, the antenna structure 500 may be arranged in such a way that it is fixed to the second bracket 320 through a conductive bracket 550.

According to an embodiment, the conductive bracket 550 may include a support portion 551 supporting at least a portion of the second substrate surface 5902 of the substrate 590, and one or more extension portions 552 and 553 extending from one end or both ends of the support portion 551. Therefore, the substrate 590 may be fixed through the conductive bracket 550 in such a way that the one or more extension portions 552 and 553 are fastened to the conductive bracket 550 through a fastening member S (e.g., a screw). For example, the second substrate surface 5902 of the substrate 590 may be attached at least in part to the support portion 551 of the conductive bracket 550 through a tape member (e.g., conductive tape).

According to various embodiments, the first bracket 319 may include a plurality of protrusions 3195 spaced apart from each other at predetermined intervals in an area corresponding to the first substrate surface 5901. According to an embodiment, each of the plurality of protrusions 3195 may have a second width d2 in a direction (e.g., the y-axis direction) in which the plurality of protrusions are arranged (or in a direction in which the plurality of chip antennas (e.g., 510, 520, 530, and 540) are arranged). According to an embodiment, the width d2 of each protrusion 3195 may be greater than the first width d1 of the separation space between the plurality of chip antennas (e.g., 510, 520, 530, and 540).

According to an embodiment, when viewed from above the first bracket 319, some of the plurality of protrusions 3195 may overlap with at least a portion of the first chip antenna 510 of the antenna structure 500 and at least a portion of the second chip antenna 520 adjacent to the first chip antenna 510. According to an embodiment, when viewed from above the first bracket 319, some of the plurality of protrusions 3195 may be disposed to overlap with edges of the first chip antenna 510 and edges of the second chip antenna 520. For example, when viewed from above the first bracket 319, some of the plurality of protrusions 3195 may be disposed such that the amount of overlap with the first chip antenna 510 is substantially equal to the amount of overlap with the second chip antenna 520. In another example, when viewed from above the first bracket 319, some of the plurality of protrusions 3195 may be disposed such that the amount of overlap with the first chip antenna 510 is different from the amount of overlap with the second chip antenna 520.

According to an embodiment, each of the plurality of protrusions 3195 may be disposed adjacent to or in contact with outer surfaces of the chip antennas (e.g., 510, 520, 530, and 540). According to an embodiment, each of the plurality of protrusions 3195 may be disposed in substantially the same way between the second and third chip antennas 520 and 530 and/or between the third and fourth chip antennas 530 and 540. According to an embodiment, when viewed from above the first bracket 319, some of the plurality of protrusions 3195 may be disposed to overlap with only the first chip antenna 510 or the fourth chip antenna 540, which is disposed at the left or right end of the array antenna AR.

According to various embodiments, when the first bracket 319 is disposed to correspond to the substrate 590 of the antenna structure 500, spaces 3191, 3192, 3193, and 3194 (e.g., recesses) spaced apart from the first substrate surface 5901 of the substrate 590 may be formed between the respective protrusions 3195. When viewed from above the first bracket 319, each of the spaces 3191, 3192, 3193, and 3194 may overlap with each of the conductive patches (e.g., 511, 521, 531, 541, and 541') of the plurality of chip antennas (e.g., 510, 520, 530, and 540). Therefore, the spaces 3191, 3192, 3193, and 3194 may be used as heat dissipation spaces spaced apart from the substrate 590. According to an embodiment, a region of the first bracket 319 between protrusions 3195, corresponding to the conductive patches (e.g., 511, 521, 531, 541, and 541'), has a thickness smaller than the surrounding region because of the spaces 3191, 3192, 3193, and 3194 spaced apart from the substrate 590, so that distortion of a beam pattern of the antenna structure 500 due to the first bracket 319 formed of a dielectric material may be reduced. In some embodiments, when two or more conductive patches 541 and 541' are disposed at an interval in one chip antenna 540, the plurality of protrusions 3195 may be disposed to avoid the two or more conductive patches 541 and 541' when viewed from above the first bracket 319.

Figure 8A:
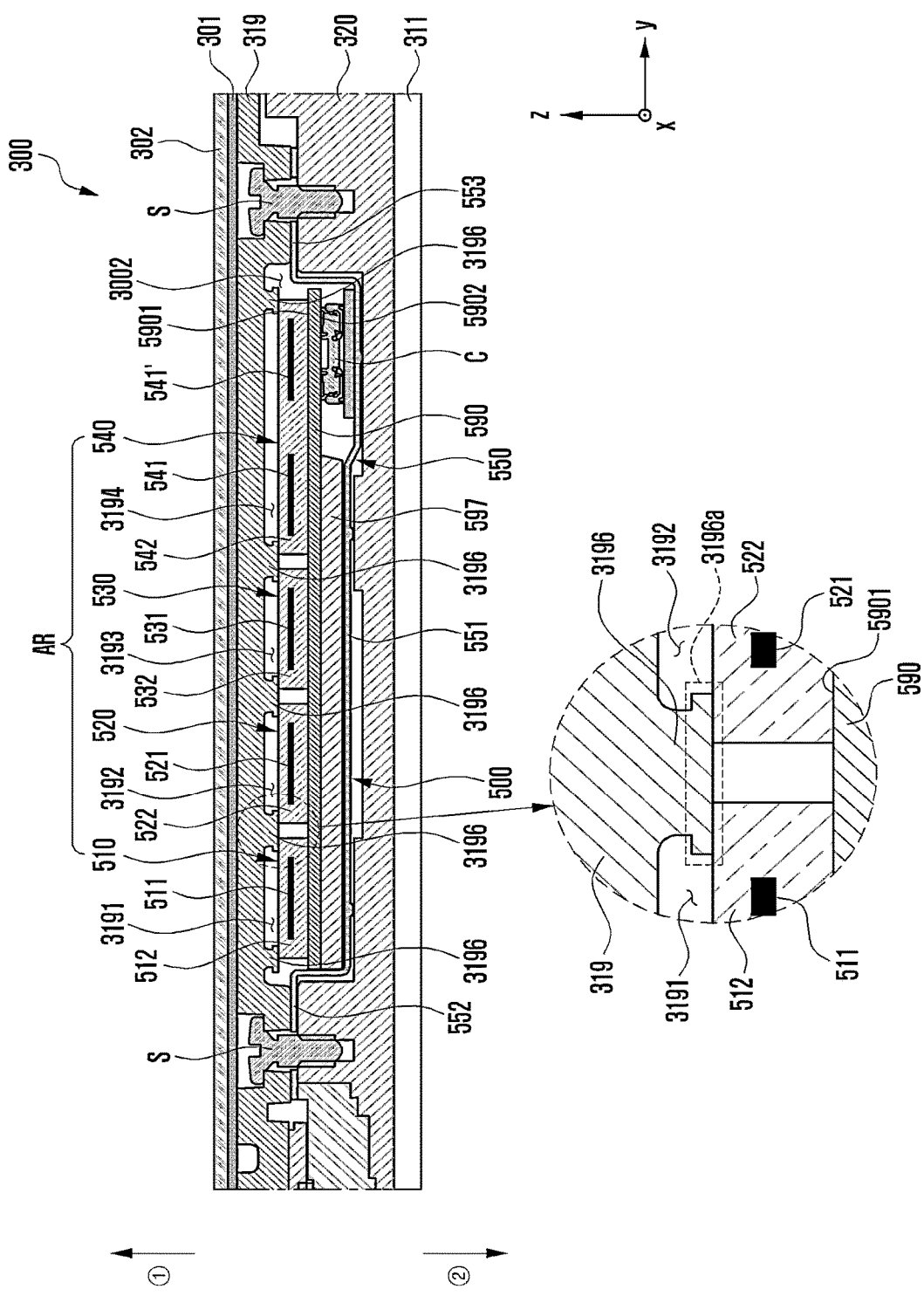
FIGS. 8A and 8B are cross-sectional views illustrating a portion of an electronic device including an antenna structure, according to various embodiments of the disclosure.
Figure 8B:
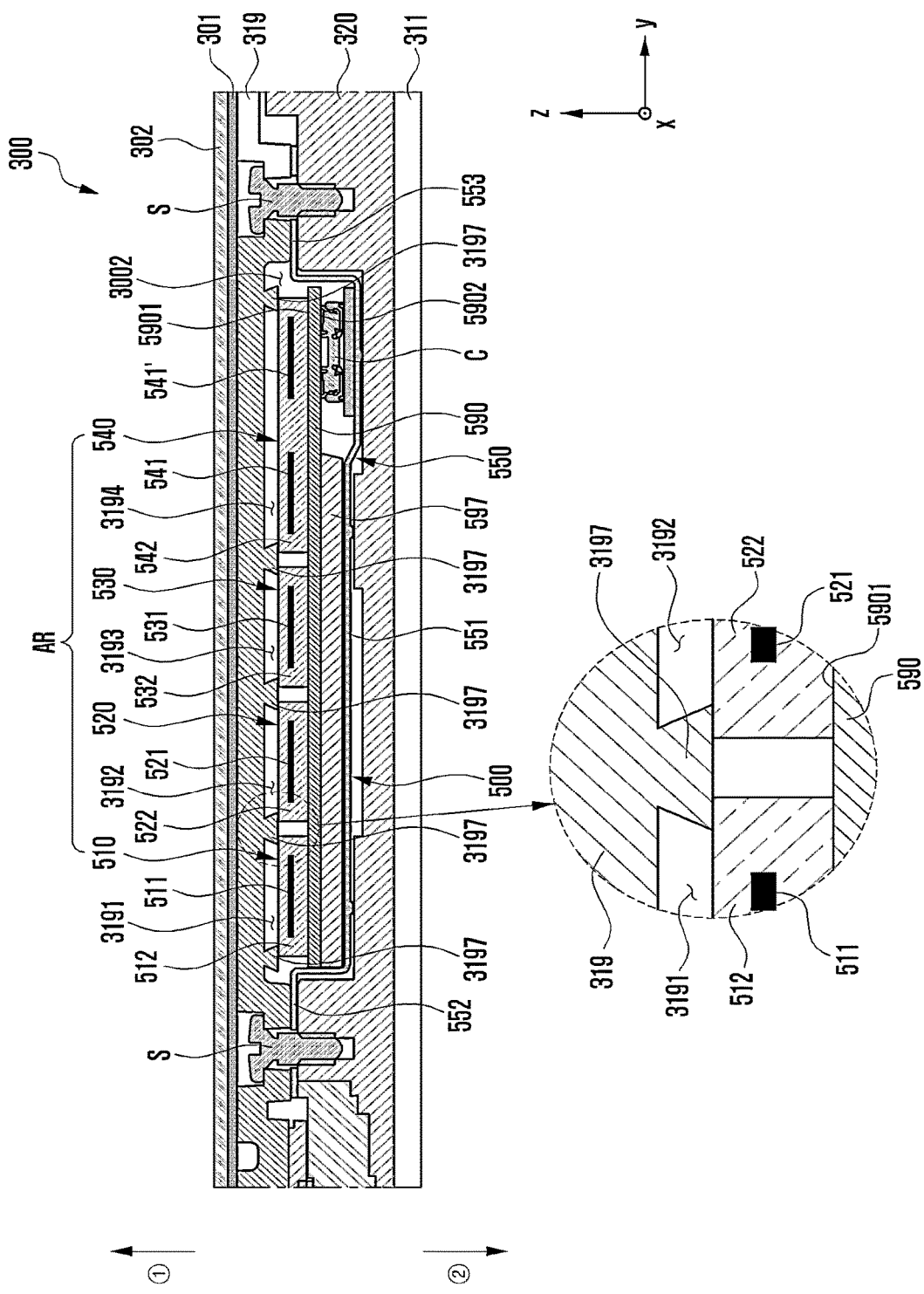

FIGS. 8A and 8B are cross-sectional views illustrating a portion of an electronic device including an antenna structure, according to various embodiments of the disclosure.

In describing the electronic device 300 of FIGS. 8A and 8B, the same reference numerals are assigned to components substantially the same as those of the electronic device 300 of FIG. 7A, and detailed descriptions thereof may be omitted.

With reference to FIG. 8A, the first bracket 319 may include a plurality of protrusions 3196 formed to be in contact with or come close to the first substrate surface 5901 of the substrate. According to an embodiment, each of the plurality of protrusions 3196 may include an extension part 3196a formed to be in contact with or come close to the first substrate surface 5901 and having an end wider than the rest. The expansion part 3196a may help in expanding the support structure of the antenna structure 500 through the first bracket 319 and reducing the degradation of radiation performance of the antenna structure 500.

With reference to FIG. 8B, the first bracket 319 may include a plurality of protrusions 3197 formed to be in contact with or come close to the first substrate surface 5901 of the substrate. According to an embodiment, each of the plurality of protrusions 3197 may be formed in a tapered shape that a cross section gradually widens from the first bracket 319 toward the first substrate surface 5901. The tapered protrusion 3197 may help in expanding the support structure of the antenna structure 500 through the first bracket 319 and reducing the degradation of radiation performance of the antenna structure 500.

According to an embodiment of the disclosure, an electronic device (e.g., the electronic device 300 in FIG. 3A) may include a housing (e.g., the housing 310 in FIG. 3A). The electronic device may include an antenna structure (e.g., the antenna structure 500 in FIG. 7A) disposed in an inner space of the housing. The antenna structure may include a substrate (e.g., the substrate 590 in FIG. 7A). The substrate may have a first substrate surface (e.g., the first substrate surface 5901 in FIG. 7A) facing in a first direction (e.g., the first direction (direction ①) in FIG. 7A) and a second substrate surface (e.g., the second substrate surface 5902 in FIG. 7A) facing in a second direction (e.g., the second direction (direction ②) in FIG. 7A) opposite to the first substrate surface. The antenna structure may include a plurality of chip antennas arranged on the first substrate surface in a third direction perpendicular to the first direction. The plurality of chip antennas may include a first chip antenna (e.g., the first chip antenna 510 in FIG. 7A), a third chip antenna (e.g., the third chip antenna 530 in FIG. 7A), and a second chip antenna (e.g., the second chip antenna 520 in FIG. 7A) located between the first and third chip antennas. Each of the first chip antenna, the second chip antenna, and the third chip antenna may include an antenna element. A first separation space between the first and second chip antennas and/or a second separation space between the second and third chip antennas may have a first width (e.g., the first width d1 in FIG. 7A) in the third direction.

The electronic device may include a wireless communication circuit (e.g., the wireless communication circuit 597 in FIG. 7A) disposed in the inner space. The wireless communication circuit may be configured to transmit and/or receive a radio signal in a selected and/or designated frequency band through the antenna structure.

The electronic device may include a first bracket (e.g., the first bracket 319 in FIG. 7A). The first bracket may include a first protrusion (e.g., one of the plurality of first protrusions 3195 in FIG. 7A) and a second protrusion (e.g., any other of the plurality of second protrusions 3195 in FIG. 7A) that protrude in the second direction to correspond to the first substrate surface of the substrate and are spaced apart from each other. The first protrusion and/or the second protrusion may have a second width (e.g., the second width d2 in FIG. 7A) greater than the first width in the third direction. When viewed from above the first bracket, the first protrusion may be aligned with the first separation space and overlap with at least a portion of the first chip antenna and at least a portion of the second chip antenna. When viewed from above the first bracket, the second protrusion may be aligned with the second separation space and overlap with at least another portion of the second chip antenna and at least a portion of the third chip antenna.

According to an embodiment of the disclosure, when viewed from above the first bracket, an overlapping amount of the first protrusion with the first chip antenna and an overlapping amount of the first protrusion with the second chip antenna may be substantially equal to each other. When viewed from above the first bracket, an overlapping amount of the second protrusion with the second chip antenna and an overlapping amount of the second protrusion with the third chip antenna may be substantially equal to each other.

According to an embodiment of the disclosure, the first bracket may further include a third protrusion and a fourth protrusion that protrude in the second direction to correspond to the first substrate surface. The first protrusion may be positioned between the third protrusion and the second protrusion, and the second protrusion may be positioned between the first protrusion and the fourth protrusion. When viewed from above the first bracket, the antenna element included in the first chip antenna may overlap with a first recess of the first bracket between the first protrusion and the third protrusion. When viewed from above the first bracket, the antenna element included in the second chip antenna may overlap with a second recess of the first bracket between the first protrusion and the second protrusion. When viewed from above the first bracket, the antenna element included in the third chip antenna may overlap with a third recess of the first bracket between the second protrusion and the fourth protrusion.

According to an embodiment of the disclosure, the first bracket may be formed, at least in part, of a dielectric material. In the first bracket, a portion corresponding to the first recess, a portion corresponding to the second recess, and a portion corresponding to the third recess may have a smaller thickness in the first direction than the first protrusion, the second protrusion, the third protrusion, and the fourth protrusion.

According to an embodiment of the disclosure, the antenna element may include a conductive patch and/or a conductive pattern.

According to an embodiment of the disclosure, the first protrusion may be in contact with a surface of the first chip antenna facing the first protrusion and/or a surface of the second chip antenna facing the first protrusion. The second protrusion may be in contact with a surface of the second chip antenna facing the second protrusion and/or a surface of the third chip antenna facing the second protrusion.

According to an embodiment of the disclosure, the first protrusion and/or the second protrusion may have a form in which a width in the third direction gradually increases toward the second direction.

According to an embodiment of the disclosure, the housing may provide a front surface of the electronic device, a rear surface of the electronic device, and a side surface of the electronic device. The first substrate surface may face the front surface. The plurality of chip antennas may form a directional beam in the first direction.

According to an embodiment of the disclosure, the electronic device 300 may further include a second bracket positioned between the first bracket and the rear surface and combined with the first bracket. The antenna structure may be disposed in a space provided between the first bracket and the second bracket.

According to an embodiment of the disclosure, the electronic device may further include a conductive bracket for connecting the antenna structure to the second bracket. The conductive bracket may extend between the antenna structure and the second bracket.

According to an embodiment of the disclosure, the conductive bracket may include a support portion and at least one extension portion extending from the support portion and fixed to the second bracket. The substrate may be disposed such that at least a portion of the second substrate surface is supported by the support portion.

According to an embodiment of the disclosure, the second bracket may be formed of a metal material.

According to an embodiment of the disclosure, the electronic device may further include a display disposed between the first bracket and the front surface and visually exposed through the front surface. The antenna structure may be located in the housing to correspond to a black matrix (BM) area of the display.

According to an embodiment of the disclosure, the housing may include a lateral member providing the side surface. The first bracket may be connected to the lateral member or integrally formed with the lateral member.

According to an embodiment of the disclosure, the first chip antenna, the second chip antenna, or the third chip antenna may include a rigid body formed of a dielectric material, and the antenna element disposed inside the rigid body. The antenna element may be electrically connected to at least one first conductive pad exposed to an outer surface of the rigid body.

According to an embodiment of the disclosure, the substrate may include at least one second conductive pad exposed to a surface of the first substrate. The at least one second conductive pad may be electrically connected to the wireless communication circuit disposed on the second substrate surface through a wiring structure.

According to an embodiment of the disclosure, the first chip antenna, the second chip antenna, or the third chip antenna may be fixed to the first substrate surface through a process of soldering the at least one first conductive pad and the at least one second conductive pad.

According to an embodiment of the disclosure, the wireless communication circuit may be disposed on the second substrate surface.

According to an embodiment of the disclosure, an electronic device 300 may include a housing and an antenna structure disposed in an inner space of the housing. The antenna structure may include a substrate having a first substrate surface facing in a first direction and a second substrate surface facing in a second direction opposite to the first substrate surface. The antenna structure may include first and second chip antennas disposed to be spaced apart from each other on the first substrate surface with a separation space of a first width. The first chip antenna may include a first antenna element, and the second chip antenna may include a second antenna element. The electronic device may include a wireless communication circuit disposed in the inner space and configured to transmit or receive a radio signal in a selected or designated frequency band through the antenna structure. The electronic device may include a first bracket including a protrusion that protrudes in the second direction to correspond to the first substrate surface. The protrusion may have a second width greater than the first width. When viewed from above the first bracket, the protrusion may be aligned with the separation space between the first chip antenna and the second chip antenna and overlap with the first chip antenna and the second chip antenna.

According to an embodiment of the disclosure, the first chip antenna may include a first rigid body formed of a dielectric material, and the first antenna element disposed inside the first rigid body. The first antenna element may be electrically connected to at least one first conductive pad exposed to an outer surface of the first rigid body. The second chip antenna may include a second rigid body formed of a dielectric material, and the second antenna element disposed inside the second rigid body. The second antenna element may be electrically connected to at least one second conductive pad exposed to an outer surface of the second rigid body. The at least one first conductive pad and the at least one second conductive pad may be electrically connected to the wireless communication circuit disposed on the second substrate surface.

The embodiments disclosed in the specification and drawings are only presented as specific examples to easily explain the technical contents of the disclosure and help the understanding of the disclosure, and it is not intended to limit the scope of the disclosure. Accordingly, it should be interpreted that all changes or modifications derived from the subject matter of the disclosure are included in the scope of various embodiments of the disclosure.

What is claimed is:

1. An electronic device comprising:
   a housing;
   an antenna structure disposed in an inner space of the housing, the antenna structure comprising:
      a substrate having a first substrate surface facing in a first direction and a second substrate surface facing in a second direction opposite to the first substrate surface, and
      a plurality of chip antennas sequentially arranged on the first substrate surface in a third direction perpendicular to the first direction,
      the plurality of chip antennas comprising a first chip antenna, a second chip antenna, and a third chip antenna sequentially arranged on the first substrate surface, each of the first chip antenna, the second chip antenna, and the third chip antenna comprising an antenna element,
      wherein the first chip antenna and the second chip antenna are separated in the third direction by a first separation space, the second chip antenna and the third chip antenna are separated in the third direction by a second separation space, and at least one of the first separation space and the second separation space has a first width in the third direction;
   a wireless communication circuit disposed in the inner space and configured to transmit or receive a radio signal in a designated frequency band through the antenna structure; and
   a first bracket comprising a first protrusion and a second protrusion that protrude in the second direction to correspond to the first substrate surface of the substrate and are spaced apart from each other,
   wherein at least one of the first protrusion and the second protrusion has a second width that is greater than the first width in the third direction,
   wherein the first protrusion overlaps with at least a portion of the first chip antenna and at least a portion of the second chip antenna when viewed from above the first substrate surface, and
   wherein the second protrusion overlaps with at least another portion of the second chip antenna and at least a portion of the third chip antenna when viewed from above the first substrate surface.

2. The electronic device of claim 1, wherein when viewed from above the first substrate surface, the first protrusion overlaps with the first chip antenna by a first amount, and the first protrusion overlaps with the second chip antenna by a second amount that is substantially equal to the first amount, and
   wherein when viewed from above the first substrate surface, the second protrusion with overlaps the second chip antenna by a third amount, and the second protrusion overlaps with the third chip antenna by fourth amount that is substantially equal to the third amount.

3. The electronic device of claim 1, wherein the first bracket further comprises a third protrusion and a fourth protrusion that protrude in the second direction to correspond to the first substrate surface,
   wherein the first protrusion is positioned between the third protrusion and the second protrusion, and the second protrusion is positioned between the first protrusion and the fourth protrusion,
   wherein the antenna element of the first chip antenna overlaps with a first recess of the first bracket between the first protrusion and the third protrusion when viewed from above the first bracket,
   wherein the antenna element of the second chip antenna overlaps with a second recess of the first bracket between the first protrusion and the second protrusion when viewed from above the first bracket, and
   wherein the antenna element of the third chip antenna overlaps with a third recess of the first bracket between the second protrusion and the fourth protrusion when viewed from above the first bracket.

4. The electronic device of claim 3, wherein at least a portion of the first bracket comprises a dielectric material, and
   wherein a thickness, in the first direction, of each a first portion of the first bracket corresponding to the first recess, a second portion of the first bracket corresponding to the second recess, and a third portion of the first bracket corresponding to the third recess is less than a thickness, in the first direction, of each of the first protrusion, the second protrusion, the third protrusion, and the fourth protrusion.

5. The electronic device of claim 1, wherein the antenna element of each of the first chip antenna, the second chip antenna, and the third chip antenna comprises at least one of a conductive patch and a conductive pattern.

6. The electronic device of claim 1, wherein the first protrusion contacts at least one of a surface of the first chip antenna facing the first protrusion and a surface of the second chip antenna facing the first protrusion, and
wherein the second protrusion contacts with at least one of a surface of the second chip antenna facing the second protrusion and a surface of the third chip antenna facing the second protrusion.

7. The electronic device of claim 1, wherein a width, in the third direction, of at least one of the first protrusion and the second protrusion gradually increases toward the second direction.

8. The electronic device of claim 1, wherein the housing provides a front surface of the electronic device, a rear surface of the electronic device, and a side surface of the electronic device,
wherein the first substrate surface faces the front surface, and
wherein the plurality of chip antennas are configured to form a directional beam in the first direction.

9. The electronic device of claim 8, further comprising:
a second bracket disposed between the first bracket and the rear surface and combined with the first bracket,
wherein the antenna structure is disposed in a space between the first bracket and the second bracket.

10. The electronic device of claim 9, further comprising:
a conductive bracket coupling the antenna structure to the second bracket,
wherein the conductive bracket extends between the antenna structure and the second bracket.

11. The electronic device of claim 10, wherein the conductive bracket comprises a support portion and at least one extension portion extending from the support portion and fixed to the second bracket, and
wherein at least a portion of the second substrate surface is supported by the support portion.

12. The electronic device of claim 9, wherein the second bracket comprises a metal material.

13. The electronic device of claim 8, further comprising:
a display disposed between the first bracket and the front surface and visually exposed through the front surface,
wherein the antenna structure is located in the housing to correspond to a black matrix area of the display.

14. The electronic device of claim 8, wherein the housing further comprises a lateral member providing the side surface, and
wherein the first bracket is coupled to the lateral member or integrally formed with the lateral member.

15. The electronic device of claim 1, wherein at least one of the first chip antenna, the second chip antenna, and the third chip antenna further comprises a rigid body formed of a dielectric material, and
wherein the antenna element is disposed inside the rigid body and is electrically coupled to at least one first conductive pad exposed to an outer surface of the rigid body.

16. The electronic device of claim 15, wherein the substrate comprises at least one second conductive pad exposed to the first substrate surface, and
wherein the at least one second conductive pad is electrically coupled to the wireless communication circuit disposed on the second substrate surface through a wiring structure.

17. The electronic device of claim 16, wherein at least one of the first chip antenna, the second chip antenna, and the third chip antenna is fixed to the first substrate surface through a process of soldering the at least one first conductive pad and the at least one second conductive pad.

18. The electronic device of claim 1, wherein the wireless communication circuit is disposed on the second substrate surface.

19. An electronic device comprising:
a housing;
an antenna structure disposed in an inner space of the housing, the antenna structure comprising:
a substrate having a first substrate surface facing in a first direction and a second substrate surface facing in a second direction opposite to the first substrate surface, and
a first chip antenna and a second chip antenna spaced apart from each other on the first substrate surface with a separation space of a first width, the first chip antenna comprising a first antenna element, and the second chip antenna comprising a second antenna element;
a wireless communication circuit disposed in the inner space and configured to transmit or receive a radio signal in a selected or designated frequency band through the antenna structure; and
a first bracket comprising a protrusion that protrudes in the second direction to correspond to the first substrate surface,
wherein the protrusion has a second width that is greater than the first width, and
wherein the protrusion is aligned, in a third direction perpendicular to the first direction, with the separation space between the first chip antenna and the second chip antenna and overlaps with the first chip antenna and the second chip antenna.

20. The electronic device of claim 19, wherein the first chip antenna further comprises a first rigid body formed of a first dielectric material,
wherein the first antenna element is disposed inside the first rigid body,
wherein the first antenna element is electrically coupled to at least one first conductive pad exposed to an outer surface of the first rigid body,
wherein the second chip antenna further comprises a second rigid body formed of a second dielectric material,
wherein the second antenna element is disposed inside the second rigid body,
wherein the second antenna element is electrically coupled to at least one second conductive pad exposed to an outer surface of the second rigid body, and
wherein the at least one first conductive pad and the at least one second conductive pad are electrically coupled to the wireless communication circuit disposed on the second substrate surface.

* * * * *